United States Patent [19]
Okabe et al.

[11] Patent Number: 6,067,130
[45] Date of Patent: May 23, 2000

[54] FERROELECTRIC LIQUID CRYSTAL COMPOSITION AND LIQUID CRYSTAL DISPLAY DEVICE

[75] Inventors: Eiji Okabe; Ryushi Shundo; Shinichi Saito; Hideo Saito, all of Chiba; Takashi Kaneko, Osaka; Tomoo Furukawa, Osaka; Akira Sakaigawa, Osaka; Mitsuhiro Koden, Osaka, all of Japan

[73] Assignees: Chisso Corporation; Sharp Kabushiki Kaisha, both of Osaka, Japan

[21] Appl. No.: 09/213,375

[22] Filed: Dec. 17, 1998

[30] Foreign Application Priority Data

Dec. 26, 1997 [JP] Japan .................................. 9-361569

[51] Int. Cl.⁷ .......................... G02F 1/141; G02F 1/133; C09K 19/34
[52] U.S. Cl. .......................... 349/37; 252/299.61; 349/34; 349/97; 349/184; 349/185; 428/1.1
[58] Field of Search .................. 252/299.61, 299.63; 349/37, 172, 175, 178, 34, 97, 184, 185; 428/1.1

[56] References Cited

U.S. PATENT DOCUMENTS 5,120,468   6/1992   Saito et al. ..................... 252/299.61
5,380,460   1/1995   Wand et al. ..................... 252/299.6

*Primary Examiner*—Shean C. Wu
*Attorney, Agent, or Firm*—Wenderoth, Lind & Ponack, L.L.P.

[57] ABSTRACT

Ferroelectric liquid crystal compositions having a large dependency of spontaneous polarization on temperature; liquid crystal display devices exhibiting a small dependency of response speed on temperature and making it possible to obtain a wide temperature margin in practical use, and fabricated by using the ferroelectric liquid crystal composition; and methods for driving the devices are provided; the compositions comprising at least one compound expressed by the following general formula (1)

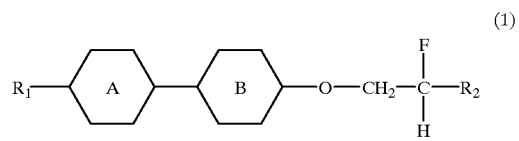

(1)

at least one compound expressed by the following general formula (2), and

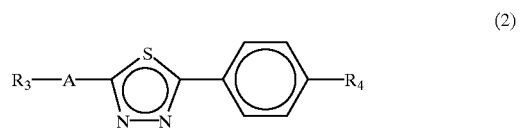

(2)

at least one compound expressed by the following general formula (3)

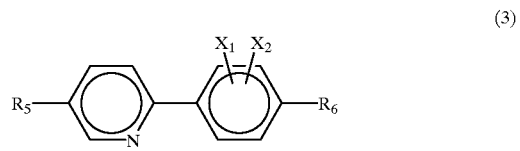

(3)

wherein $R_1$ to $R_6$, ring A-B, A, $X_1$, and $X_2$ are herein defined.

13 Claims, 16 Drawing Sheets

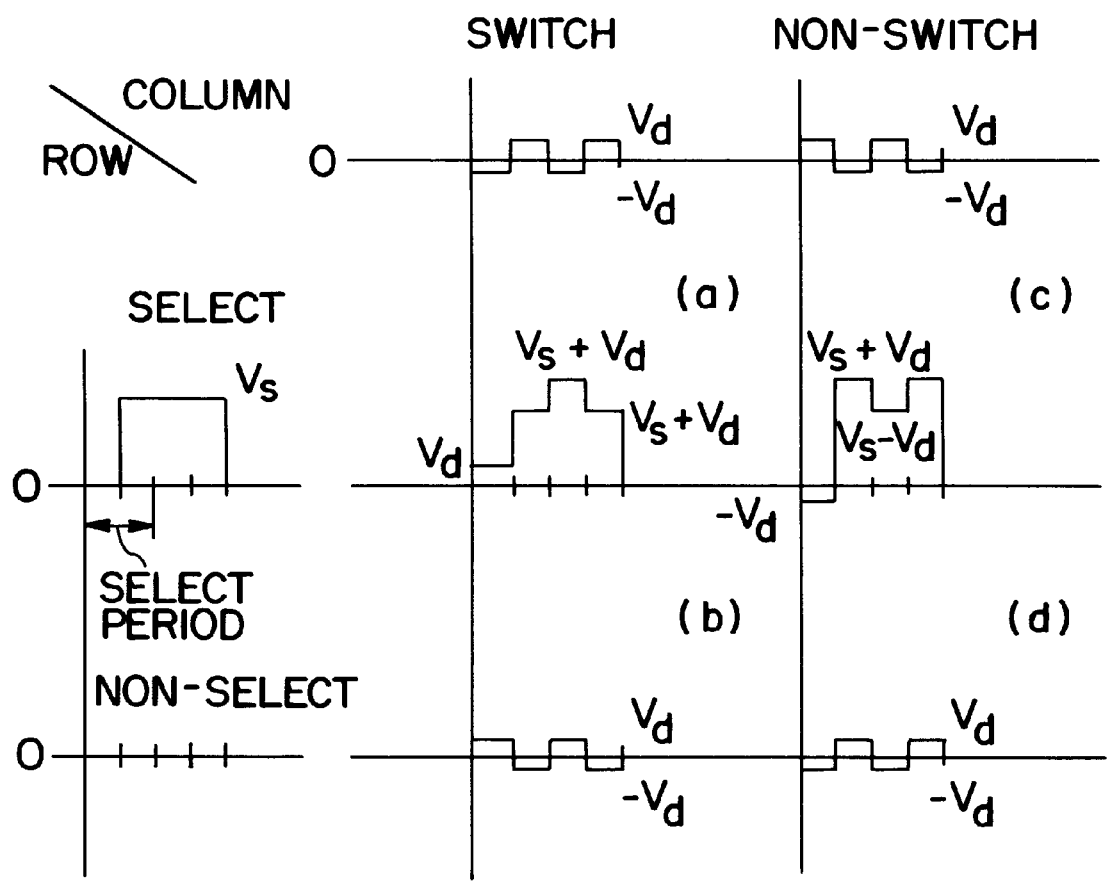
F I G. 7

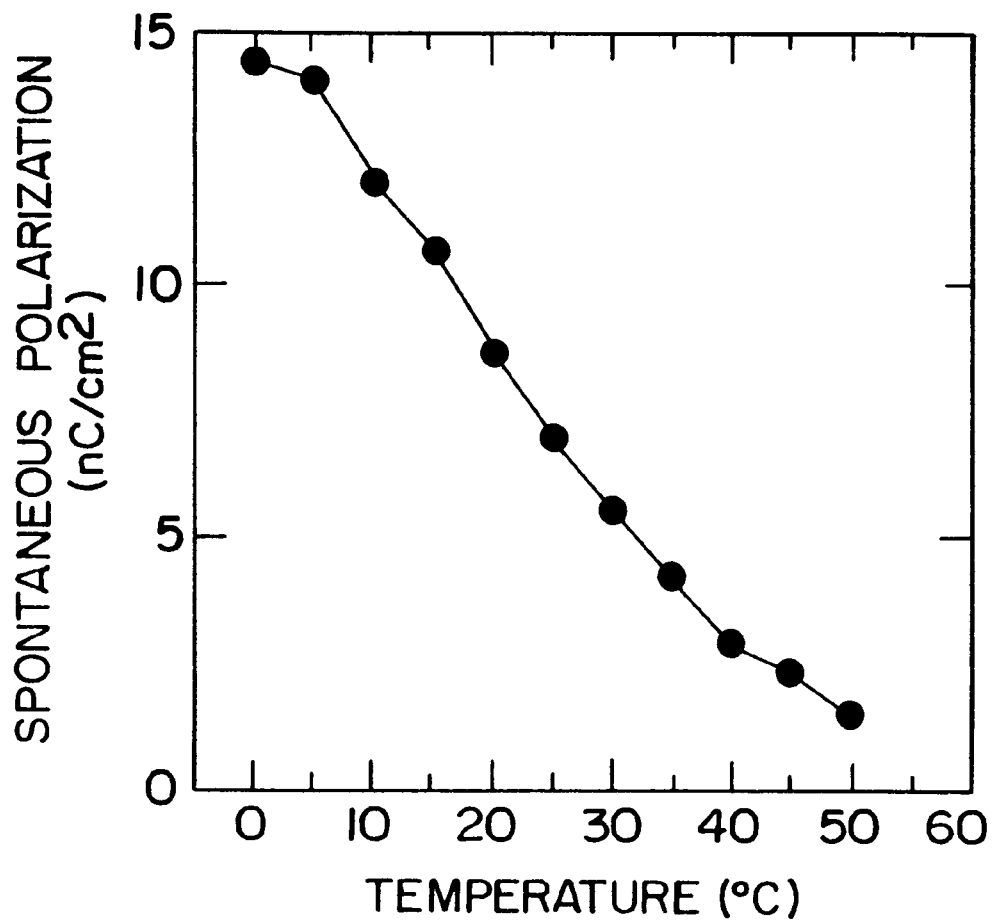
F I G. 13

FERROELECTRIC LIQUID CRYSTAL COMPOSITION AND LIQUID CRYSTAL DISPLAY DEVICE

TECHNICAL FIELD

The present invention relates to ferroelectric liquid crystal compositions. More specifically, it relates to ferroelectric liquid crystal compositions having a large dependency of spontaneous polarization on temperature; liquid crystal display devices fabricated by using the composition; and methods for driving the devices.

BACKGROUND ART

While liquid crystal compositions are widely employed as materials for display devices, almost all currently used liquid crystal display devices employ Twisted Nematic (TN) type display mode which uses nematic phase. TN type display mode used for liquid crystal displays are classified into two large groups. One of them is an active/matrix mode in which a switching device is provided to each pixel. As an example of this mode, display mode using Thin Film Transistor (TFT) has been proposed. Whereas the display quality of this mode has reached a level which is comparable with that of Cathode Ray Tube (CRT), expansion of screen size is difficult and production cost is high. The other one is Super Twisted Nematic (STN) mode. Whereas this mode is improved in contrast and dependency on viewing angle compared with conventional simple matrix mode, display quality has not reached the level of CRT. However, production cost is low. Accordingly, these two modes have a merit and demerit when their quality and production cost are taken into account.

As a method which is expected to solve the problems of the two modes, ferroelectric liquid crystal (FLC) has appeared on the market. When "FLC" is simply remarked at present, it means Surface Stabilized Ferroelectric Liquid Crystal (SSFLC). The SSFLC was proposed by N. A. Clark and S. T. Lagerwall (Appl. Phys. Lett. 36, 899 (1980)). Since then, SSFLC is said to be a liquid crystal of the next generation; its development and commercialization is being worked by makers of household electric appliances and raw material manufactures; and improvements of its characteristics and its preparation for the market are also being conducted by them.

This is because ferroelectric liquid crystal display devices inherently have the following characteristics:

(1) Quick response
(2) Memory-effect
(3) Wide viewing angle

The characteristics mentioned above suggest a possibility of realizing display devices having a large capacity by using SSFLC, and the characteristics make SSFLC very attractive.

However, as the researches and developments advance, problems to be solved have been made clear. Among them, one of important subjects is development of a stable memory. As the cause of difficulty in stably developing memory, unevenness of smectic layer structure (for example, twisted alignment and chevron structure) and generation of internal inverse electric field which is considered to be caused by an excessively large spontaneous polarization are conceived.

As a means for developing stable memory-effect, a method has been proposed in which a ferroelectric liquid crystal composition having a negative dielectric anisotropy (hereinafter sometimes abbreviated to $\Delta\epsilon$) is used (c.f. Paris Liquid Crystal Conference, p. 217 (1984)). This method is called "AC stabilize effect". Liquid crystal molecules having a negative $\Delta\epsilon$ have such a property that they turn to the direction parallel to that of glass substrates (major axis of the molecules points to the direction vertical to the direction of electric field) when an electric field is applied to the direction vertical to that of electrodes in a cell which is subjected to homogeneous aligning treatment. Spontaneous polarization responds to electric field when electric field of a low frequency is applied. Accordingly, when the direction of the electric field is reversed, liquid crystal molecules shift to another stable state as a consequence of its reversal, and come to the state parallel to the direction of substrates by the effect of $\Delta\epsilon$. When electric field of a high frequency is applied, spontaneous polarization becomes unable to follow the reversal of the electric field, only $\Delta\epsilon$ has effects, shift of liquid crystal molecules does not occur even if the direction of electric field was reversed, and thus the liquid crystal molecules remain parallel to the substrates. This is a mechanism for developing memory-effect taking advantage of the AC stabilize effect. High contrast can be obtained by this mechanism, and its specific examples are already reported (c.f. SID '85 Digest p. 128 (1985)).

Separately, "Method for utilizing liquid crystal materials having a negative dielectric anisotropy" is proposed by P. W. H. Surguy et al., Ferroelectrics, 122, 63 (1991)). This is a promising method for actualizing a high contrast, and ferroelectric liquid crystal displays prepared by using this method are disclosed in P. W. Ross, Proc. SID, 217 (1992). These ferroelectric liquid crystal displays are described in detail in the followings.

In the case of ordinary ferroelectric liquid crystal materials dielectric anisotropy of which is not negative, $\tau$ (pulse width necessary to make it memorize) lowers in a monotone as voltage (V) increases. In contrast with, in the case of ferroelectric liquid crystal materials having a negative anisotropy, $\tau$-V characteristic exhibiting a :minimum (relative minimum) value ($\tau$-$V_{min}$) is obtained. Surguy et al. have reported JOERS/Alvey driving method as a driving method which utilize the characteristic. Principle of this driving method is that the memory state of ferroelectric liquid crystal display devices is switched when a voltage of |Vs−Vd| is applied, and it is not switched when a voltage |Vs+Vd| which is higher than |Vs−Vd| is applied or when a voltage |Vd| which is lower than |Vs−Vd| is applied.

As described above, since ferroelectric liquid crystal materials having a negative dielectric anisotropy can be applied for display devices which utilize the AC stabilize effect and $\tau_{min}$, they quietly have a possibility of being employed for actualizing ferroelectric liquid crystal display devices.

One of other important subjects posed by SSFLC is extremely high sensitivity of its optical response to temperature. In the case of TN type display mode, desired transmitting light intensity is obtained by synergism of dielectric anisotropy of liquid crystal molecules and electric field. Accordingly, the quantity of transmitting light to be obtained is nearly decided by dielectric constant of liquid crystal molecules and voltage to be applied, and viscosity affects only to the portions of transient optical response.

On the other hand, in the case of SSFLC, it has spontaneous polarization, and the quantity of transmitting light is changed by switching the stable state of liquid crystal molecules by using driving force PS-E produced by the spontaneous polarization (Ps) and electric field (E). Response speed ($\tau$) at this time is approximately expressed by the equation $$\tau \propto (\eta/PS \cdot E) \quad (1)$$

and directly affected by viscosity (η). Further, since the viscosity largely varies with temperature, response speed τ is liable to be affected by temperature. That is, in the case of SSFLC, in contrast to TN type display mode, it is directly affected by viscosity and becomes sensitive to temperature since desired quantity of transmitting light is obtained by taking advantage the transient optical response according to equation (1)

This subjects relates to the principle for driving SSFLC. That is, it is extremely difficult to make the response speed of SSFLC independent from viscosity. On the other hand, it is very difficult to reduce the dependency of viscosity on temperature. Accordingly, in order to actualize display devices having a small dependency on temperature, spontaneous polarization Ps or electric field E which is a factor other than viscosity in equation (1) should be changed toward the direction in which the variation of viscosity with temperature is extinguished.

Whereas it is comparatively easy to change electric field E depending on the change in temperature, circuits become complex and IC drivers having a high withstand voltage become necessary in this case, leading to cost up of the devices. However, even if a function by which electric field E varies in response to the change in temperature is added to devices, it is possible to suppress the cost up by using liquid crystal compositions having a large dependency of spontaneous polarization Ps on temperature coping with the change in viscosity. That is, the use of such compositions having a large dependency of PS on temperature has such an advantage that the performances of liquid crystal display devices are improved.

DISCLOSURE OF THE INVENTION

An object of the present invention is to provide ferroelectric liquid crystal compositions having a large dependency of spontaneous polarization on temperature, and to provide liquid crystal display devices fabricated by using the ferroelectric liquid crystal composition and methods for driving the devices.

The present invention relates to ferroelectric liquid crystal compositions comprising at least one compound expressed by the following general formula (1), at least one compound expressed by the following general formula (2), and at least one compound expressed by the following general formula (3)

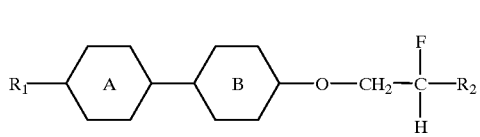

wherein $R_1$ represents an alkyl group or alkoxy group having 4 to 16 carbon atoms, $R_2$ represents an alkyl group having 2 to 12 carbon atoms, and ring A-B represents 5-substituted, 2-(4-substituted phenyl)pyridine or 1-, 4-(5-substituted pyridinyl-2)benzene,

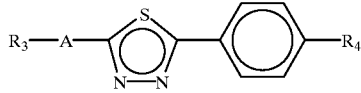

wherein $R_3$ and $R_4$ independently represent an alkyl group or alkoxy group having 1 to 15 carbon atoms, and A represents 1,4-phenylene, 1,4-cyclohexylene, or single bond, and

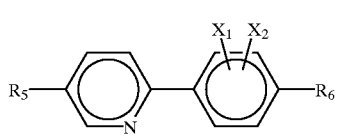

wherein $R_5$ and $R_6$ independently represent an alkyl group or alkoxy group having 1 to 18 carbon atoms, and $X_1$ and $X_2$ independently represent H or F.

Also, the present invention relates to liquid crystal display devices fabricated by using the liquid crystal composition and methods for driving the devices.

BRIEF DESCRIPTION OF THE DRAWINGS

FIG. 7 is a drawing showing a driving waveform (C) for driving a ferroelectric liquid crystal display device by using τ-V characteristic of a ferroelectric liquid crystal material.

FIG. 13 is a drawing showing the dependency of spontaneous polarization Ps of ferroelectric liquid crystal composition (e) of the present invention on temperature.

BEST MODE FOR CARRYING OUT THE INVENTION

Figure 1:
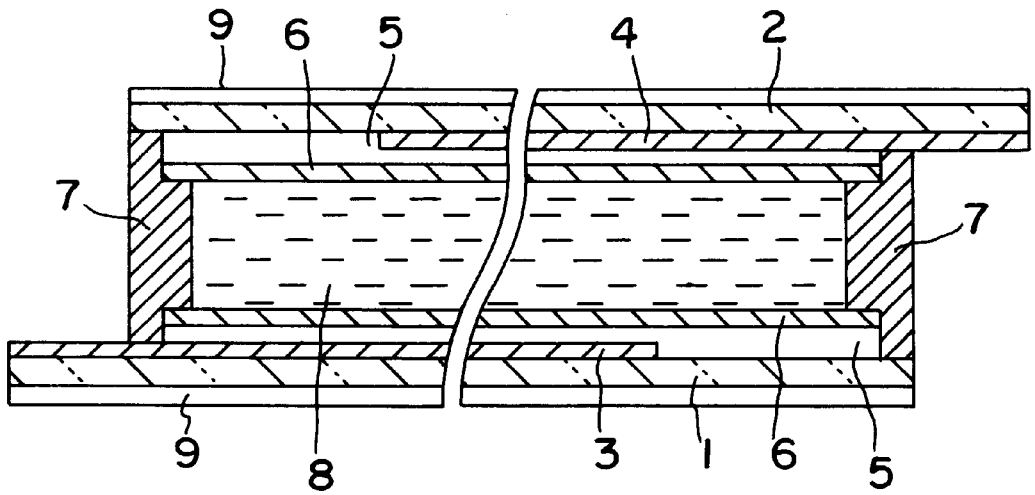
FIG. 1 is a cross-sectional view for explaining a structure of a ferroelectric liquid crystal display device fabricated by using a ferroelectric liquid crystal composition of the present invention and for explaining a method for fabricating the device.

Phase transition temperatures of typical compounds among the compounds expressed by the general formula (1) are shown in Table 1.

TABLE 1

| Compound No. | $R_1$ | $R_2$ | Skeleton | Cr | SX2 | SX1 | SC* | N* | I |
|---|---|---|---|---|---|---|---|---|---|
| I-1 | $C_8H_{17}$— | $C_6H_{13}$— | (A) | .63 | | SI* | 73.7 · | 81.0 | · |
| I-2 | $C_{10}H_{21}$— | $C_6H_{13}$— | (A) | .61 | | SI* | 76.5 · | 83.6 | · |
| I-3 | $C_6H_{13}$— | $C_6H_{13}$— | (B) | .56 · | 72.4 | · | 79.7 · | 84.9 | · |
| I-4 | $C_8H_{17}$— | $C_6H_{13}$— | (B) | .59 | | · | 73.5 · | 81.5·87.1 | · |
| I-5 | $C_8H_{17}$— | $C_8H_{17}$— | (B) | .75 | | · | 81.4 · | 89.8 | · |
| I-6 | $C_8H_{17}O$— | $C_6H_{13}$— | (B) | .73 | | · | 81.4 · | 107.9 | · |
| I-7 | $C_8H_{17}O$— | $C_8H_{17}$— | (B) | .77 | | · | 81.9 · | 108.9 | · |

In Table 1, numeral indicate phase transition temperature (° C.), and Cr, SX2, SX1, SI*, SC*, N*, and I mean crystal, chiral smectic phase which is in an order higher than SX1, high order smectic phase, chiral smectic I phase, chiral smectic C phase, cholesteric phase, and isotropic liquid, respectively. Symbol means that the phase abbreviated above the symbol exists. Besides, (A) indicates that the skeleton (ring A-B) in the general formula (1) is (5-substituted, 2-(4-substituted phenyl)pyridine):

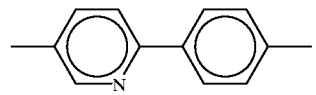

and (B) indicates that the skeleton (ring A-B) in the general formula (1) is (1-, 4-(5-substituted pyridinyl-2)benzene):

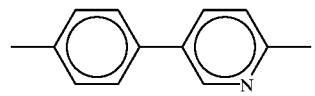

respectively.

Compounds expressed by the general formula (1) are already disclosed in Japanese Patent Application No. Sho 63-190842. According to the publication, the compounds have the following characteristics:

(1) Absolute value of spontaneous polarization Ps is large.

(2) Sign of spontaneous polarization changes depending on temperature.

(3) Temperature at which the sign of Ps changes is higher than 25° C.

In connection with the change of the sign, it is described in the publication that the phenomenon of changing the sign of spontaneous polarization is not observed in liquid crystal compositions in which the content of the compounds expressed by the general formula (1) is less than 60% by weight.

During the course of investigation leading to the achievement of the present invention, the characteristic (4) described below was first found out, and then the characteristic was found out to develop even in liquid crystal compositions in which content of the compounds expressed by the general formula (1) is less than 60% by weight.

(4) Dependency of spontaneous polarization on temperature is large.

When application of such liquid crystal compositions for liquid crystal display devices is taken into consideration, the lower mixing ratio of the compounds is advantageous in the following aspects:

(i) Such important physical properties as dielectric anisotropy $\Delta\epsilon$, viscosity $\eta$, phase series, and phase transition temperatures can be controlled by compounds other than those expressed by the general formula (1).

(ii) Since helical pitch in cholesteric phase becomes shorter as the mixing ratio of the compounds expressed by the general formula (1) increases, when the mixing ratio is small, the pitch becomes longer and uniform alignment of liquid crystal molecules increases in the case where it is used as SSFLC.

(iii) Spontaneous polarization Ps increases as the mixing ratio of the compounds expressed by the general formula (1) increases. Liquid crystal compositions having a large spontaneous polarization are generally large in reverse electric field induced by reversal of molecular alignment and so-called a phenomenon of image sticking becomes serious. Accordingly, excellent SSFLC display devices in which phenomenon of image sticking is less frequently observed can be obtained by providing liquid crystal compositions having a low mixing ratio of the compounds expressed by the general formula (1) and thus having a comparatively small Ps. Accordingly, the content of the compounds expressed by the general formula (1) is preferably less than 30% by weight.

Further, preferable liquid crystal compositions of the present invention can be provided by satisfying the following conditions (a) to (c):

(a) The liquid crystal compositions further comprise at least one optically active compound direction of helical of which compound is opposite to the direction of helical of a compound expressed by the general formula (1) each induced in cholesteric phase. In this case, it is preferable to include 40 to 90% by weight of the compounds expressed by the general formula (2) and 10 to 60% by weight of the compounds expressed by the general formula (3) in the ferroelectric liquid crystal compositions of the present invention.

(b) Phase transition series of the compositions include isotropic liquid phase, cholesteric phase, smectic A phase, and chiral smectic C phase (such phase transition series is sometimes abbreviated to INAC phase series) in order from high temperature side. In this case, it is preferable to include 40 to 90% by weight of the compounds expressed by the general formula (2) and 10 to 60% by weight of the compounds expressed by the general formula (3) in the liqud crystal compositions of the present invention.

(c) The compositions have a negative dielectric anisotropy absolute value of which is 2 or more.

In the present invention, 2-(4-propylphenyl)-5-(4-octylphenyl)thiadiazole (compound expressed by the general formula (2) wherein $R_3$ is propyl, $R_4$ is octyl, and A is phenyl) and the likes can be mentioned as the compounds expressed by the general formula (2).

As the compounds expressed by the general formula (3), 2-(4-pentyloxyphenyl)-5-heptylpyridine (compound expressed by the general formula (3) wherein $R_5$ is heptyl, $R_6$ is pentyl, and $X_1=X_2=H$) and the likes can be mentioned.

Next, the liquid crystal display devices of the present invention are described with reference to FIG. 1.

FIG. 1 is a cross-sectional view for showing a basic structure of a ferroelectric liquid crystal display device fabricated by using a liquid crystal composition of the present invention. Principally, this ferroelectric liquid crystal display device comprises a pair of insulating substrates 1 and 2 having conductive films 3 and 4, respectively, as electrode; a ferroelectric liquid crystal composition 8 intervened between the substrates 1 and 2; a driving means (not shown in the drawing) for switching optical axis of the liquid crystal by selectively applying a voltage on the electrodes mentioned above; and a polarizing plate 9 as a means for optically identifying the switching of the optical axis mentioned above. In FIG. 1, 5 is an insulating film, 6 is alignment control film, and 7 is a sealing agent. As the insulating substrates 1 and 2, translucent substrates are employed and generally glass substrates are used.

On the insulating substrates 1 and 2, transparent electrodes 3 and 4 of a prescribed pattern are formed by depositing $InO_3$, $SnO_2$, ITO (Indium-Tin Oxide), and the like by CVD (Chemical Vapor Deposition) method or sputtering method. Film thickness of the transparent electrodes is preferably 50 to 200 nm.

On the transparent electrodes 3 and 4, insulating film 5 having a film thickness of 50 to 200 nm can be formed, when desired. As the insulating film 5, for example, such an inorganic thin film as that of $SiO_2$, SiNx, $Al_2O_3$, and $Ta_2O_5$, or such an organic thin film as that of polyimide, photoresist resin, and polymer liquid crystal can be used. In the case where an insulating film 5 is an inorganic thin film, it can be formed by a vapor deposition method, sputtering method, CVD method, or solution coating method. In the case where the insulating film 5 is an organic thin film, it can be formed by coating a solution of an organic substance or solution of its precursor by a spinner coating method, immersion coating method, screen printing method, or roll coating method, and then curing under prescribed conditions (heat, or UV radiation). Alternatively, the organic film can be formed by a vapor depositing method, sputtering method, CVD method, or LB (Langmuir-Blodgett) method. This insulating film 5 can be omitted.

On insulating film 5, alignment control film 6 is formed in a film thickness of 10 to 100 nm. As described above, in the case where insulating film is omitted, an alignment control film is formed directly on conducting films 3 and 4. For this alignment control film 6, an inorganic or organic film can be used. For inorganic alignment control film, silicon oxide or the likes can be used, and known methods such as an oblique, vapor depositing method and rotating vapor depositing method can be used for forming the film. For an organic alignment film, polyamide, polyvinyl alcohol, polyimide, or the likes can be used, and their surface is usually subjected to an alignment treatment by a rubbing method. When a polymer liquid crystal or LB film is used, it is possible to align them with a magnetic field, or alignment by a spacer edge method can be applied. Also, $SiO_2$, SiNx, or the like may be formed into a film by a depositing method, sputtering method, CVD method, or the like and then subjecting the surface of the film to a rubbing.

Next, two insulating substrates 1 and 2 are bonded together through sealing agent 7, and ferroelectric liquid crystal composition 8 is filled in the space between the substrates to form a liquid crystal display device. As ferroelectric liquid crystal composition 8, compositions comprising the compounds expressed by the general formula (1) described above can be used.

Whereas the liquid crystal display device is described as a switching device of one pixel in FIG. 1, the liquid crystal display devices of the present invention can be applied for apparatuses of a large capacity matrix. In this case, electrode wiring of upper and lower substrates 1 and 2 are used in combination in a matrix type as shown in the schematic plan view of FIG. 2.

Figure 2:
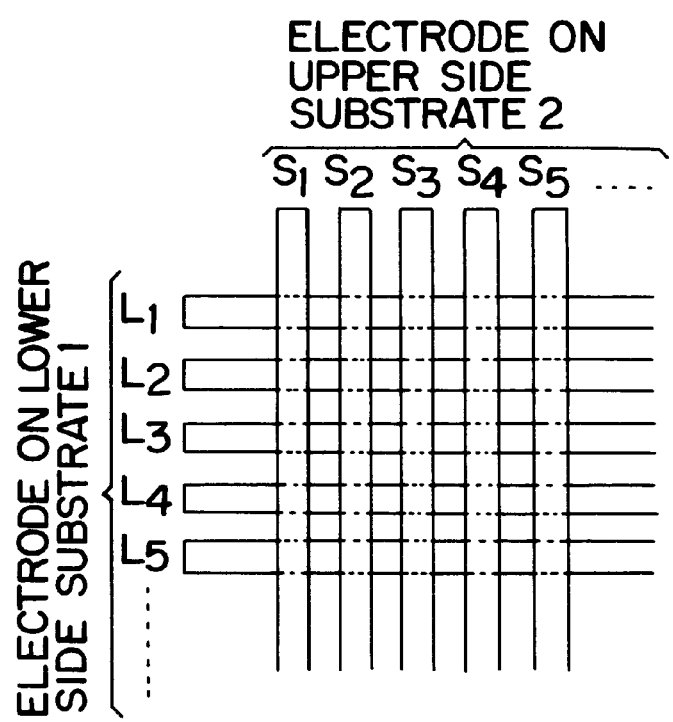
FIG. 2 is a diagrammatical drawing for showing a method for preparing a ferroelectric liquid crystal display device having a large capacity by using a ferroelectric liquid crystal composition of the present invention.
Figure 3:
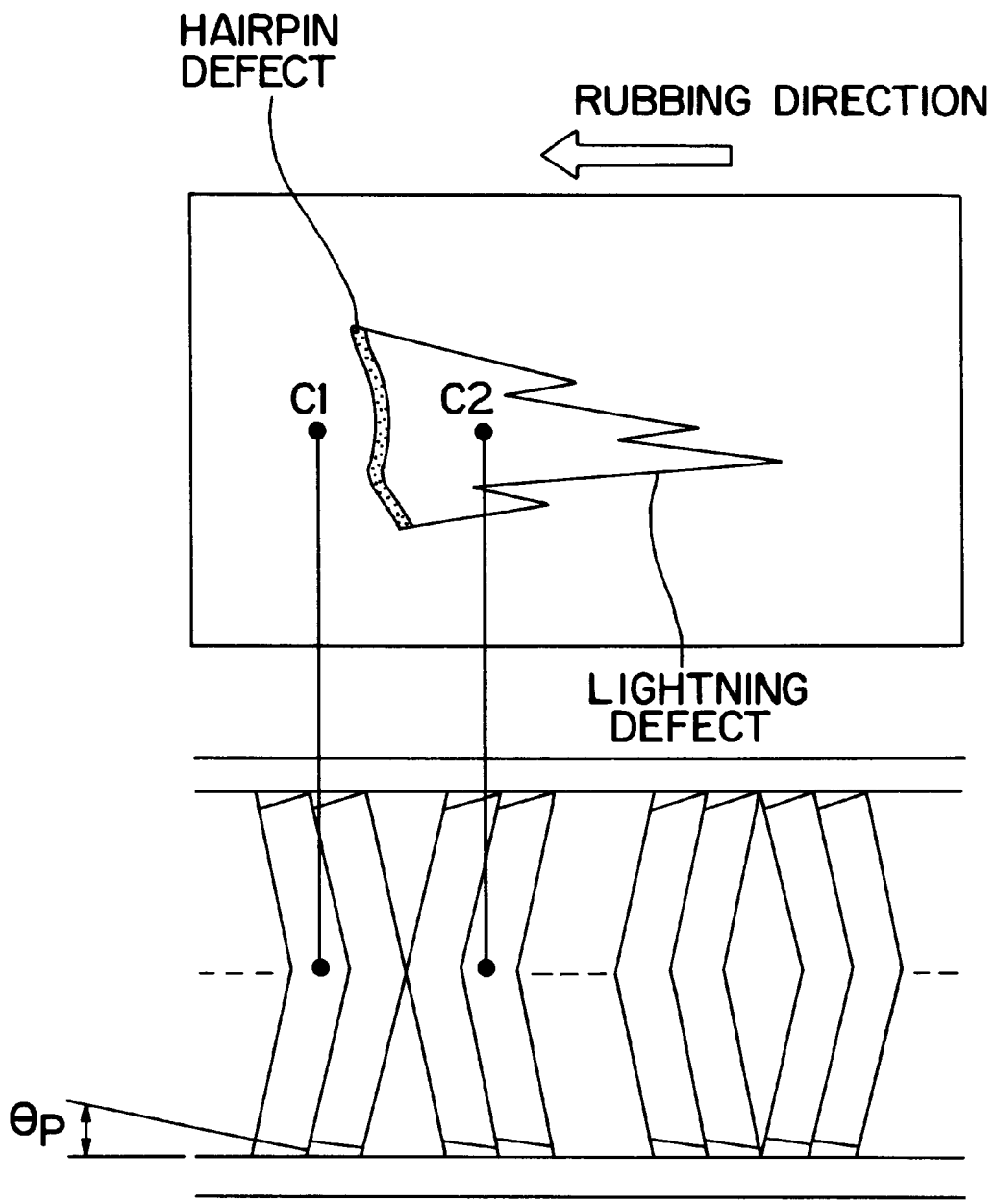
FIG. 3 is a drawing for explaining C1 alignment and C2 alignment in a ferroelectric liquid crystal display device.

FIG. 3 is a drawing for explaining C1 alignment and C2 alignment in the liquid crystal display device shown in FIG. 2. As the methods for alignment treatment in the liquid crystal display device described above, rubbing method is preferable. The rubbing method includes a parallel rubbing, anti-parallel rubbing, and one substrate rubbing as main methods. Parallel rubbing is a method in which upper and lower substrates are rubbed and direction of the rubbing is substantially parallel. Anti-parallel rubbing is a method in which upper and lower substrates are rubbed and direction of the rubbing is substantially anti-parallel. One substrate rubbing is a method in which only one substrate between upper and lower substrates is rubbed.

Most preferable method for obtaining a uniform alignment in the present invention is the use of a cell which is subjected to a parallel rubbing in combination with a ferroelectric liquid crystal composition having INAC phase series. In this case, a helical structure exists in nematic phase. However, since alignment direction of molecules is controlled from both sides, that is, from the sides of upper substrate and lower substrate, a uniform alignment is easily obtained in nematic phase, and an alignment in which the normal of layers is in the same direction can readily be obtained if the liquid crystals are cooled down from the nematic phase to chiral smectic C phase via smectic A phase.

However, even in liquid crystal display devices of parallel rubbing, alignment caused in chiral smectic C phase is in no way one state. There are two causes of the fact that totally uniform alignment state is not obtained. One relates to bending of smectic layer. It is well known in the art that ferroelectric liquid crystals exhibit a bent layer structure (chevron layer structure), and two domains may exist as shown in FIG. 3. Kanbe et al. named these domains as C1 and C2, respectively, from the relation with pretilt. (In C2 alignment, the bending direction (chevron direction) of a smectic layer structure of the ferroelectric liquid crystal composition is the same as the pretilt direction of liquid crystal molecules at the interface of the liquid crystal with an alignment film.) The other is uniform (U) and twist (T). "Uniform" is an alignment which shows an extinction position and "twist" is an alignment which does not show an extinction position.

M. Koden et al. have reported that three alignments of C1U (C1 uniform), C1T (C1 twist), and C2 were obtained in a ferroelectric liquid crystal cell of parallel rubbing prepared by using a high pretilt alignment film (M. Koden et al., Jpn. J. Appl. Phys., 30, L1823 (1991)).

Figure 4:
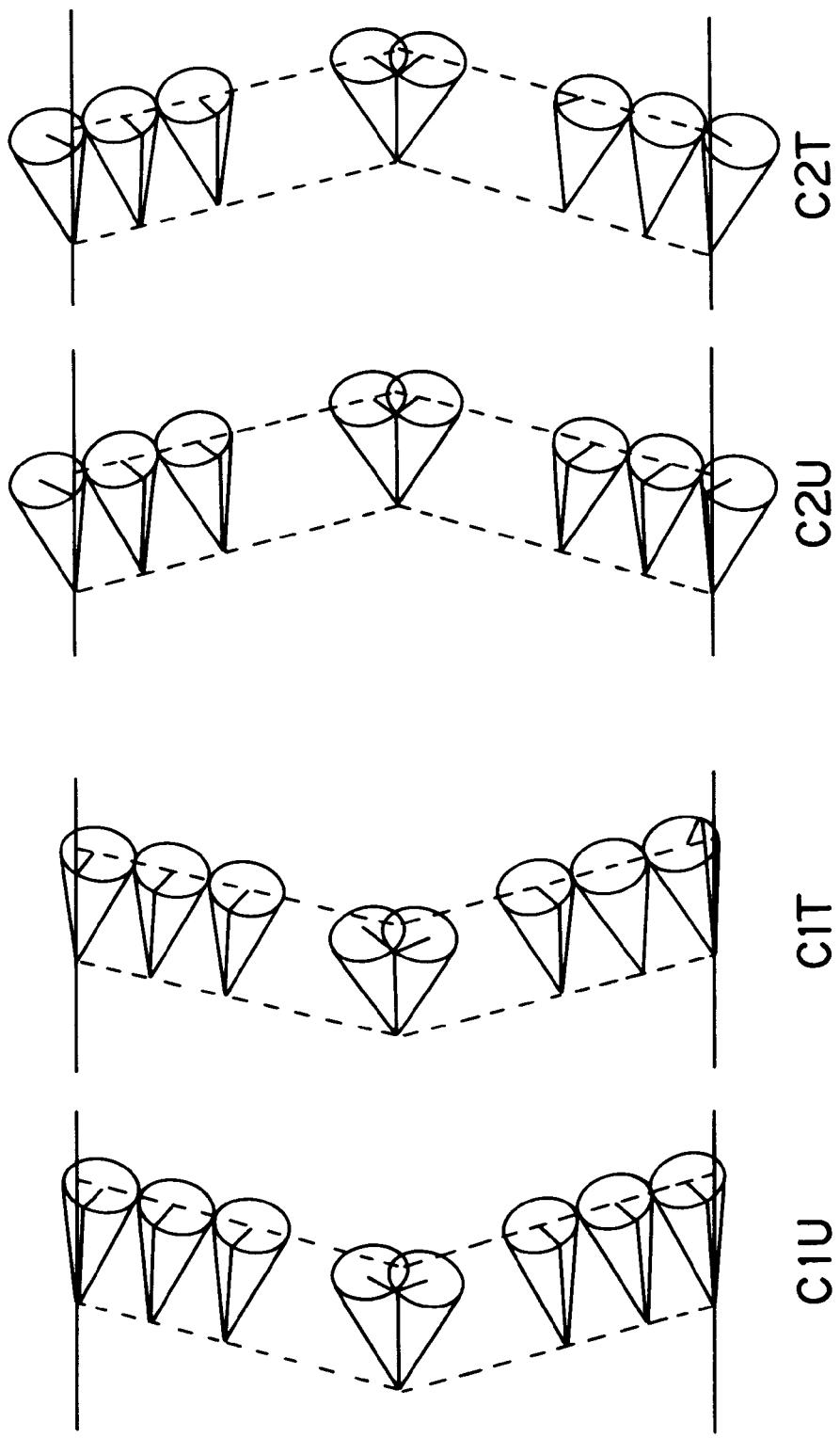
FIG. 4 is a drawing showing a model of molecular alignment in four alignment states in a ferroelectric liquid crystal display device.

As a result of more detailed investigation by the present inventors, it was confirmed that four alignment states of C1U, C1T, C2U, and C2T exist in a ferroelectric liquid crystal cell of parallel rubbing. Molecular alignment in these alignment states are shown in FIG. 4. As the result of the study on these four alignment states, the following facts (1) to (4) were found:

(1) C1U and C1T alignments are difficult to drive since they are hardly switched.

(2) Good contrast can not be obtained in C1T alignment even if it was switched, since C1T alignment does not have an extinction position.

(3) C2U alignment provides an excellent switching characteristic and good contrast.

(4) Whereas C2T alignment does not exhibit extinction property when an electric field is not applied, it exhibits extinction property as uniform alignment does when an appropriate degree of a bias electric field is applied in the case where liquid crystal materials have a negative dielectric anisotropy. Accordingly, excellent switching characteristics and good contrast can be obtained even in C2T alignment.

Development of C1 alignment and C2 alignment is related to pretilt angle, and C2 state can be developed within the range of pretilt angle between 0° to 15°. When pretilt angle is large, C2 state has only one alignment state which shows an extinction position as Koden et al. have reported, and this is rather preferable. However, since it tends to become C1 alignment rather than C2 alignment as pretilt angle increases, pretilt angle is preferably smaller than 10°.

Next, driving method is described. While it goes without saying that JOERS/Alvey driving method by driving waveform (A) shown in FIG. 5 can be used, a driving method by driving waveform (B) shown in FIG. 6 can also be used. In these driving methods, partial rewriting is possible and thus the methods are preferable for producing displays having such a large display capacity as 2000×2000 lines. In driving waveform (B), a voltage waveform applied on a pixel is shown by one of (a) to (d). Now, the waveforms at the time of non-rewriting are assumed to be one of (b) to (d). Then, τ at the time when a voltage of one of waveforms (b) to (d) is applied is the same, and quantity of transmitting light is approximately the same. Accordingly, excellent displays causing no flicker can be obtained. Malvern driving method (WO 92/02925 (PCT)) one example of which is driving waveform (C) shown in FIG. 7 is one in which a main pulse width is designed to b(e changed into an optional length in contrast to JOERS/Alvey driving method by driving waveform (A) which uses 0V portion 1 time slot and a main pulse portion in which 1 time slot is not 0V. Since the timing at which voltage is applied can be superimposed between electrodes and line address time can be shortened in Malvern driving method, this is one of preferable driving methods.

Driving methods of ferroelectric liquid crystal materials having a τ-V characteristic showing a minimum value of pulse width τ, including the driving methods described above are characterized by the following points.

In these driving methods, (i) a first pulse voltage V1 and then a second pulse voltage V2, or a first pulse voltage −V1 and then a second pulse voltage −V2 are first applied onto a pixel on a selected scanning electrode in the period of rewriting to bring ferroelectric liquid crystal molecules into one stable state or the other stable state by the polarity of applied voltage regardless of the stable state before the voltage is applied, and (ii) subsequently, a first pulse voltage V3 and then a second pulse voltage V4, or a first pulse voltage −V3 and then a second pulse voltage −V4 are applied or to the same pixel in the period of maintenance to maintain the previous stable state, and (iii) the voltages V1, V2, V3, and V4 to be applied for the rewriting and maintenance described above satisfy the following equations:

$$0 < V2 < V4$$

$$V2 - V1 < V4 - V3$$

That is, at the first 2 time slots in the period of selection, the waveform applied for maintenance has a higher second pulse voltage than the waveform applied for rewriting, and the voltages are designed so that the voltage difference between the first pulse and the second pulse become larger.

Figure 5:
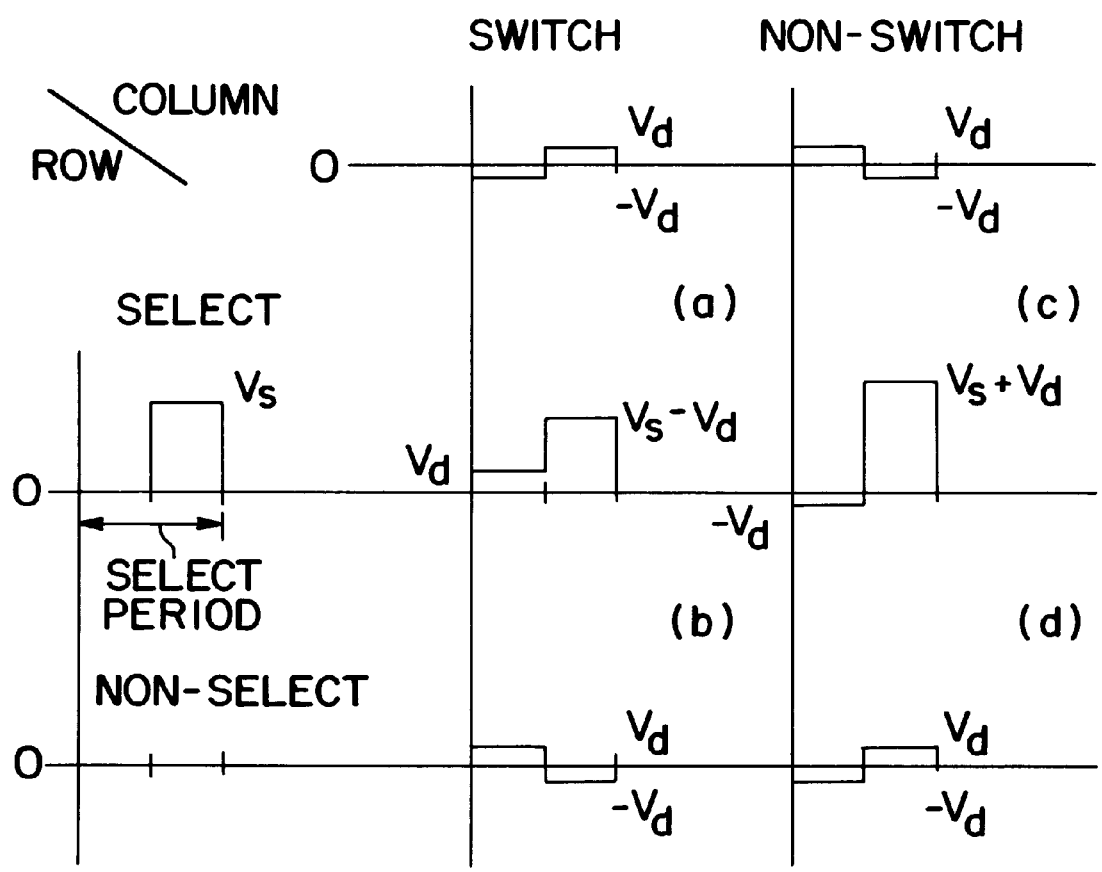
FIG. 5 is a drawing showing a driving waveform (A) for driving a ferroelectric liquid crystal display device by using τ-V characteristic of a ferroelectric liquid crystal material.
Figure 6:
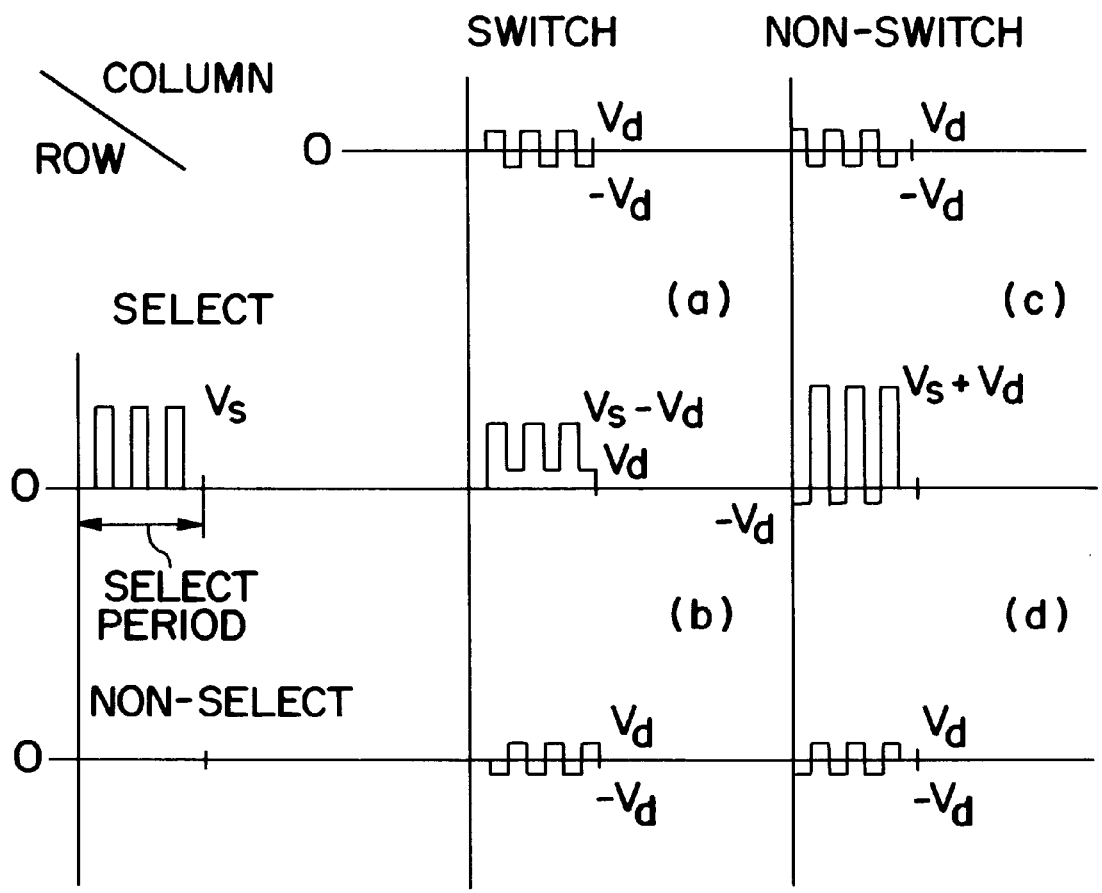
FIG. 6 is a drawing showing a driving waveform (B) for driving a ferroelectric liquid crystal display device by using τ-V characteristic of a ferroelectric liquid crystal material.
Figure 8:
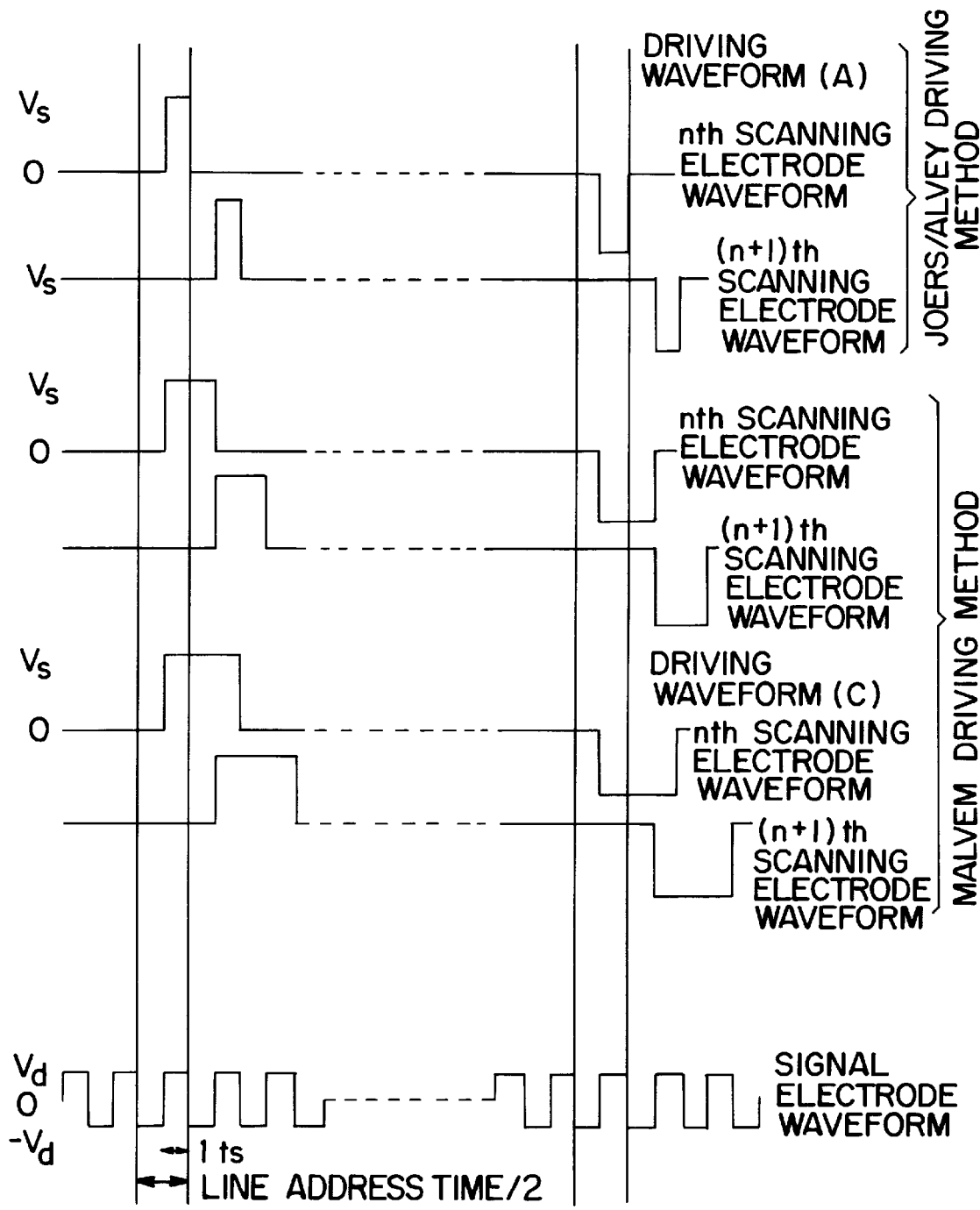
FIG. 8 is a drawing showing a driving waveform (D) for driving a ferroelectric liquid crystal display device by using τ-V characteristic of a ferroelectric liquid crystal material.

In driving waveform (A) in FIG. 5, the relation of these voltages V1, V2, V3, and V4 is $$V1=Vd, V2=Vs-Vd, V3=-Vd, V4=Vs+Vd,$$

in driving waveform (B) in FIG. 6, it is $$V1=0, V2=Vs-Vd, V3=-Vd, V4=Vs+Vd$$

and, in driving waveform (C) in FIG. 7, the relation is $$V1=Vd, V2=Vs-Vd, V3=-Vd, V4=Vs+Vd.$$

In τ-V characteristic of liquid crystal display devices, voltage $V_{min}$ which provides a minimum value $\tau_{min}$ of pulse width τ is directly related to a maximum voltage value to be applied. In connection thereto, ferroelectric liquid crystal materials having a $V_{min}$ of 60 V or lower become necessary from the aspect of withstand voltage of driving circuit to be used, and those having a $V_{min}$ of 35 V or lower become necessary from the aspect of using driving circuits employing IC drivers in general use.

In driving ferroelectric liquid crystal materials having τ-V characteristic which exhibits a minimum value of pulse width τ, it is possible to perform gradational display because a waveform applied for rewriting a specific area (portion) in a pixel can be used as the waveform to be applied for maintenance in the other area in the same pixel, or a waveform applied for maintenance of a specific area of a pixel can be used as the waveform to be applied for rewriting in the other area of the same pixel, by optionally forming domains having different driving characteristics in a pixel, for instance, through a method wherein the structure of display devices such as cell gap and form of electrodes are modified.

While parallel rubbing, C2 alignment, specific driving methods are described in the above as an example of extremely preferable methods for utilizing the liquid crystal display devices of the present invention, it goes without saying that the present invention is by no means restricted to the methods, and that other types of liquid crystal display devices and driving methods can be used.

Next, applicability of liquid crystal compositions of the present invention to liquid crystal display devices utilizing $\tau_{min}$ is described. In a simple system in which, the layer is assumed to have a bookshelf structure, the following equation is formulated (c.f. Liquid Crystals 6, No. 3, p 341 (1989)).

$$E_{\min} = \frac{P_s}{3^{1/2} \cdot \varepsilon_0 \cdot \Delta\varepsilon \cdot \sin^2\theta} \qquad ②$$

wherein $E_{min}$ indicates voltage at a pulse width of a minimum value, Ps does spontaneous polarization, $\varepsilon_0$ does dielectric constant in vacuum, Δε does dielectric anisotropy, and θ indicates tilt angle.

From this equation, it can be understood that in order to make $E_{min}$ a practical voltage, for example, lower than 40 V, spontaneous polarization should be 7 nC/cm² or less in the case where a liquid crystal material having a θ of 20° and Δε of −2, and a cell of 2 μm thick were used (c.f. Ferroelectrics vol. 122, p 63 (1991)). Whereas this equation can not be applied as it is since actual layer in many liquid crystal compositions has a chevron structure, the equation can be used to obtain an approximate value. What can be seen from this equation is that the smaller Ps and the larger Δε and θ are, the lower can $E_{min}$ be made.

Minimum value of pulse width (τmin) is inversely proportional to the square number of spontaneous polarization (c.f. Ferroelectrics vol. 122, p 63 (1991)). That is, in order to shorten $\tau_{min}$, it is necessary to make spontaneous polarization Ps large. When it is taken into consideration together with equation ②, it is possible to perform a high speed driving by making $E_{min}$ low, for example, lower than 40 V, and further making $\tau_{min}$ short. In order to achieve such purpose, however, liquid crystal materials having a large negative Δε value are necessary to be used. Conversely speaking, if liquid crystal materials having a large negative Δε value are used, Ps can be made large and $\tau_{min}$ can be shorten even when $E_{min}$ was set up at a low value. Any compounds expressed by the general formula (2) or (3) described above and used in the liquid crystal compositions of the present invention have a large negative Δε value. Accordingly, it is considerably efficient to apply the liquid crystal compositions of the present invention to liquid crystal display devices which utilize $\tau_{min}$.

While application of the liquid crystal composition of the present invention to liquid crystal display devices utilizing $\tau_{min}$ is described in the above as a key subject, the present invention is concerned with development of large dependency of spontaneous polarization Ps on temperature by the use of new liquid crystal compositions and concerned with liquid crystal display devices taking advantage of the development of the dependency. Accordingly, the ferroelectric liquid crystal compositions of the present invention can be applied not only for liquid crystal display devices utilizing $\tau_{min}$ or AC stabilize effect, but also for ordinary SSFLC display devices.

EXAMPLES

Now, the present invention will be described in more detail with reference to Examples. However, it should be understood that the present invention is by no means restricted by the Examples. In the Examples, determination of each of physical properties were carried out by the following methods:

Phase transition temperature (° C.): Phase transition temperature was determined by the observation under a polarizing microscope provided with a hot stage used for controlling temperature. Melting point was determined by using a differential scanning calorimeter (DSC). In the following Examples, phase transition temperature (° C.) is shown between the symbols which indicate phases. Symbols Cr, SX, SC, SA, N, and ISO indicate crystal, smectic phase of a high order, smectic C phase, smectic A phase, nematic phase, and isotropic liquid, respectively.

Spontaneous polarization (nC/cm²): First, a sample liquid crystal composition is filled in a cell subjected to an alignment treatment and having an electrode space of 1.5 μm, then, a peak of polarization inversion current is taken out of current response waveform when a rectangular waveform of ±15 V and 1 kHz is applied, and spontaneous polarization is determined from its area.

τ-V characteristic ($V_{min}$, $\tau_{min}$): Two, positive or negative mono-polar pulse is alternatively applied without applying a bias voltage onto a ferroelectric liquid crystal display device fabricated by the method described below. τ-V characteristic is determined by the observation of switching domain under a polarizing microscope. Pulse width τ in which a domain is inverted 100% is sought at each of peak values by varying peak value of mono-polar pulse to obtain —V curve. From the τ-V curve. peak value ($V_{min}$) and pulse width ($τ_{min}$) at its minimum value are obtained.

As a preliminary arrangement for preparing ferroelectric liquid crystal compositions, such non-chiral composition (non-ferroelectric liquid crystal compositions) as shown below were first prepared.

Composition (A):

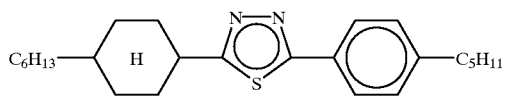

35% by weight

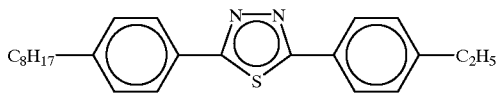

15% by weight

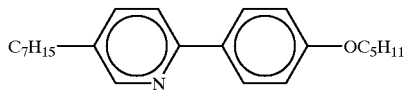

50% by weight

This composition had the following phase transition temperatures:

Cr −31° C. SX −10° C. SC 72.8° C. SA 85.8° C. N 98.1° C. ISO

Composition (B):

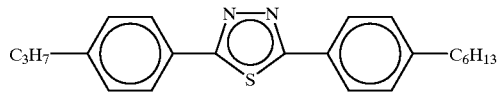

25% by weight

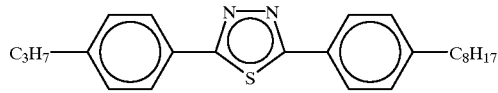

12.5% by weight

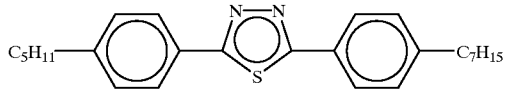

12.5% by weight

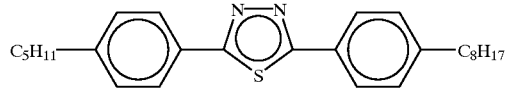

25% by weight

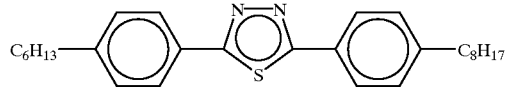

25% by weight

This composition had the following phase transition temperatures:

Cr 43° C. SC 126.9° C. N 154.8° C. ISO

Composition (C):

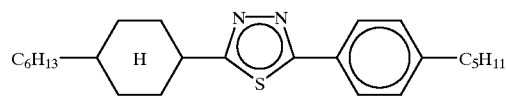

70% by weight

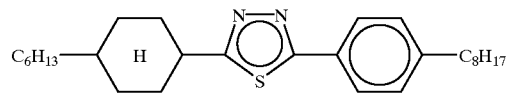

30% by weight

This composition had the following phase transition temperatures:

Cr 29° C. SA 144.7° C. N 145.0° C. ISO

Composition (D):

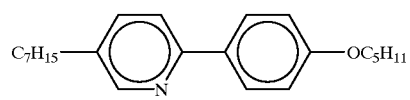

20% by weight

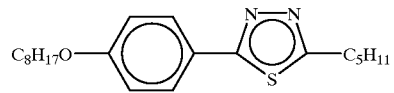

15% by weight

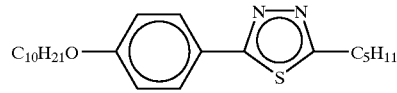

20% by weight

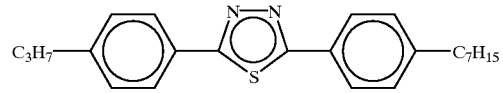

25% by weight

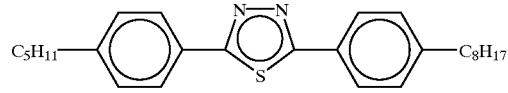

20% by weight

This composition had the following phase transition temperatures:

Cr −4° C. SC 86.5° C. SA 96.8° C. N 101.8° C. ISO

Composition (E):

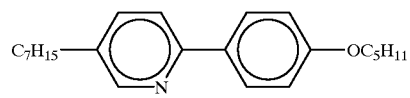

20% by weight

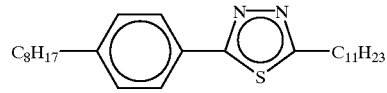

15% by weight

-continued

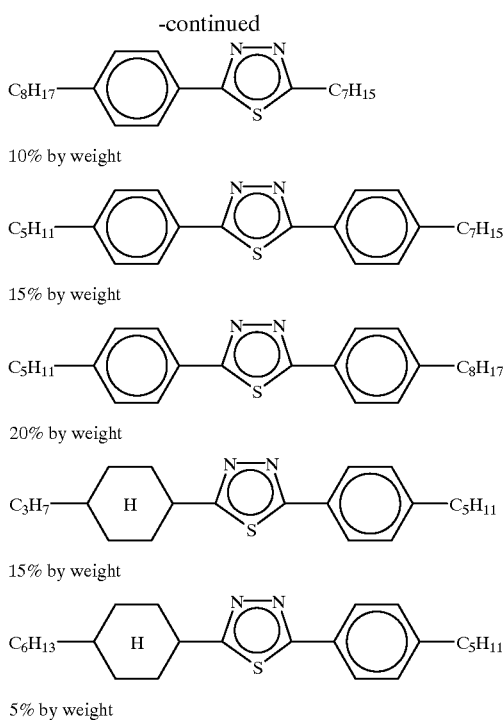

10% by weight

15% by weight

20% by weight

15% by weight

5% by weight

This composition had the following phase transition temperatures:

Cr −32° C. SC 80.5° C. SA 92.7° C. N 100.5° C. ISO

Composition (F):

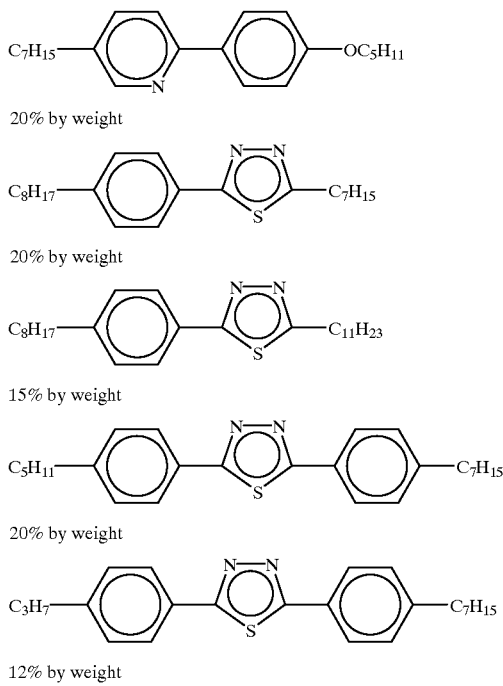

20% by weight

20% by weight

15% by weight

20% by weight

12% by weight

-continued

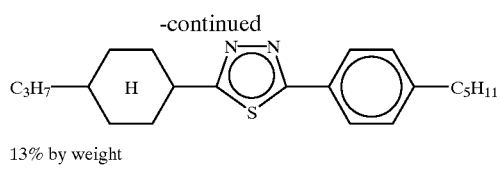

13% by weight

This composition had the following phase transition temperatures:

Cr −29° C. SC 74.8° C. SA 85.0° C. N 89.6° C. ISO

Composition (G):

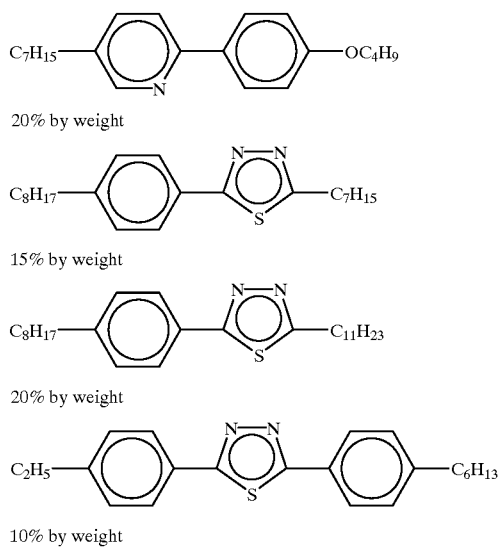

20% by weight

15% by weight

20% by weight

10% by weight

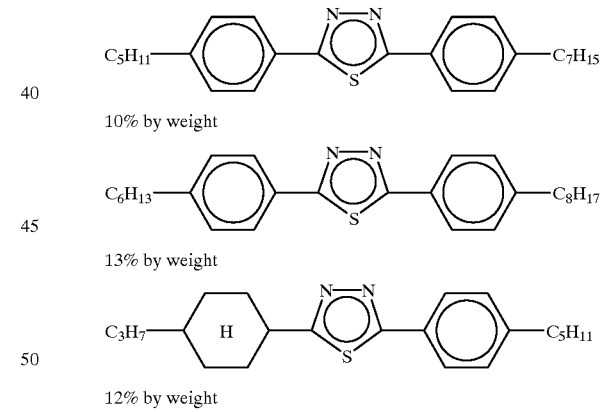

10% by weight

13% by weight

12% by weight

This composition had the following phase transition temperatures:

Cr −34° C. SC 71.4° C. SA 81.5° C. N 87.2° C. ISO

Composition (H):

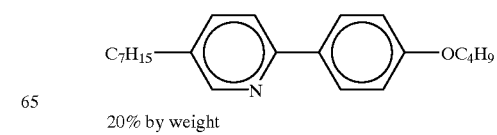

20% by weight

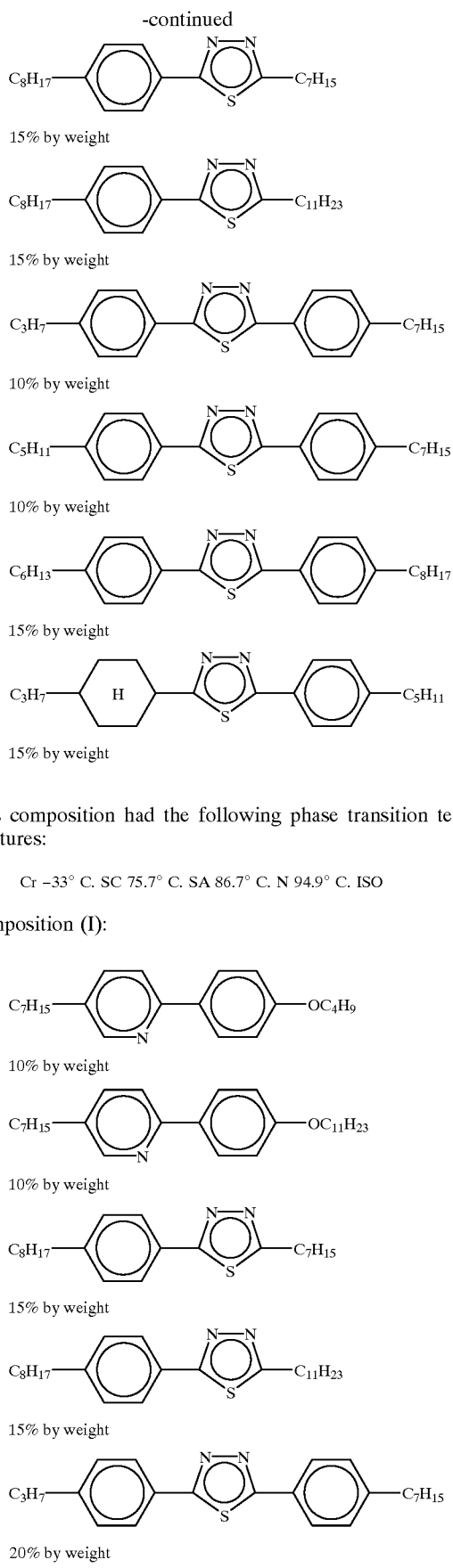

15% by weight

15% by weight

10% by weight

10% by weight

15% by weight

15% by weight

This composition had the following phase transition temperatures:

Cr −33° C. SC 75.7° C. SA 86.7° C. N 94.9° C. ISO

Composition (I):

10% by weight

10% by weight

15% by weight

15% by weight

20% by weight

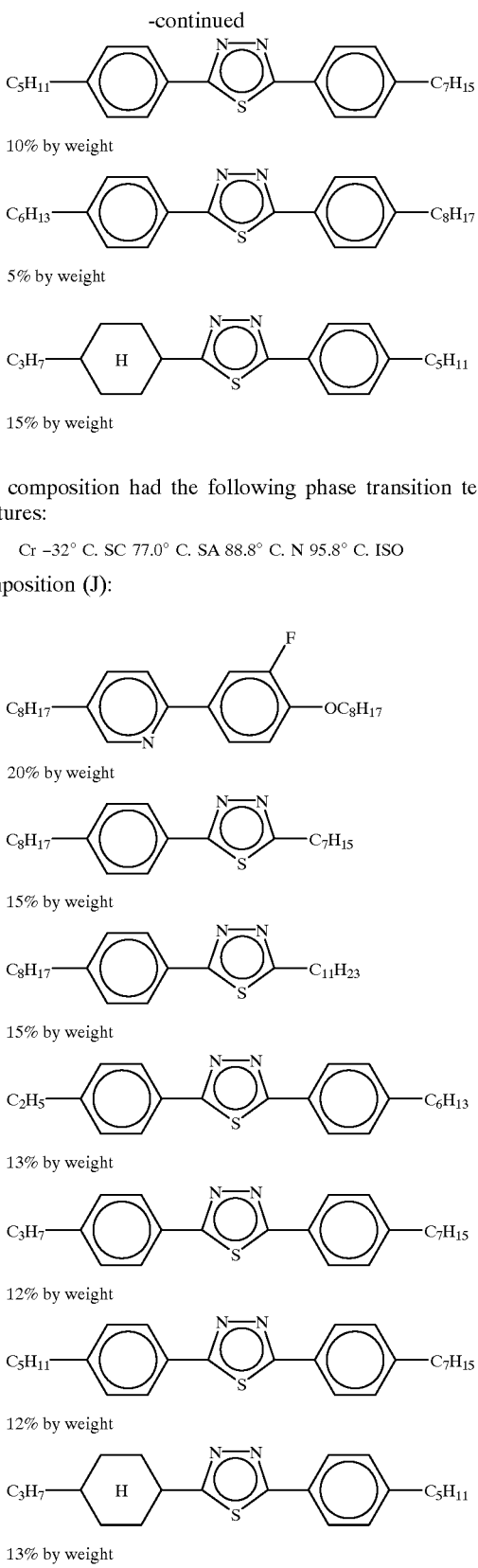

10% by weight

5% by weight

15% by weight

This composition had the following phase transition temperatures:

Cr −32° C. SC 77.0° C. SA 88.8° C. N 95.8° C. ISO

Composition (J):

20% by weight

15% by weight

15% by weight

13% by weight

12% by weight

12% by weight

13% by weight

This composition had the following phase transition temperatures:

Cr −44° C. SC 73.7° C. SA 85.8° C. N 91.7° C. ISO

Composition (K):

| Composition (A) | 75% by weight |
|---|---|
| Composition (B) | 10% by weight |
| Composition (C) | 15% by weight |

This composition had the following phase transition temperatures:

SC 74.5° C. SA 93.8° C. N 107.5° C. ISO

Composition (L):

| Composition (A) | 80% by weight |
|---|---|
| Composition (B) | 20% by weight |

This composition had the following phase transition temperatures:

SC 80.8° C. SA 88.9° C. N 107.2° C. ISO

Composition (M):

| Composition (A) | 60% by weight |
|---|---|
| Composition (B) | 20% by weight |
| Composition (C) | 20% by weight |

This composition had the following phase transition temperatures:

SC 81.1° C. SA 100.6° C. N 115.7° C. ISO

Composition (N):

| Composition (A) | 90% by weight |
|---|---|
| Composition (B) | 10% by weight |

This composition had the following phase transition temperatures:

SC 76.9° C. SA 87.3° C. N 102.8° C. ISO

Composition (O):

| Composition (A) | 80% by weight |
|---|---|
| Composition (B) | 10% by weight |
| Composition (C) | 10% by weight |

This composition had the following phase transition temperatures:

SC 76.8° C. SA 92.8° C. N 107.1° C. ISO

Composition (P):

| Composition (B) | 10% by weight |
|---|---|
| Composition (F) | 90% by weight |

This composition had the following phase transition temperatures:

SC 78.6° C. SA 97.0° C. N 95.5° C. ISO

Composition (Q):

| Composition (B) | 10% by weight |
|---|---|
| Composition (C) | 10% by weight |
| Composition (F) | 80% by weight |

This composition had the following phase transition temperatures:

SC 78.9° C. SA 91.9° C. N 100.6° C. ISO

In each of the Examples described below, ferroelectric liquid crystal display devices were obtained by using the following methods:

ITO transparent electrode of 200 nm was formed on each of two glass substrates, an insulating film comprising $SiO_2$ of 100 nm was formed on the transparent electrodes, an alignment control film of 50 nm thick was formed on the insulating films by coating method, and then the alignment control films were subjected to rubbing, respectively. Subsequently, these two glass substrates were arranged so that rubbing direction became parallel, and stuck together in a cell thickness of 1.5 µm. A ferroelectric liquid crystal composition was put into the space in the cell, the cell was once heated up to a temperature at which the liquid crystal composition was charged into an isotropic liquid, and then the cell was cooled at a rate of 1° C./min down to room temperature to obtain a ferroelectric liquid crystal composition which exhibited C2 alignment entirely in pixels.

In the following Examples, compounds used as component in liquid crystal compositions are indicated by the Compound No. shown in Table 1 above.

Example 1

Ferroelectric liquid crystal composition (a) was prepared by mixing Compound (I-1) with Composition (K) in the following ratio:

| Compound (I-1) | 10% by weight |
|---|---|
| Composition (K) | 90% by weight |

This composition (a) had the following phase transition temperatures:

SC 73.7° C. SA 93.6° C. N 103.1° C. I

Figure 9:
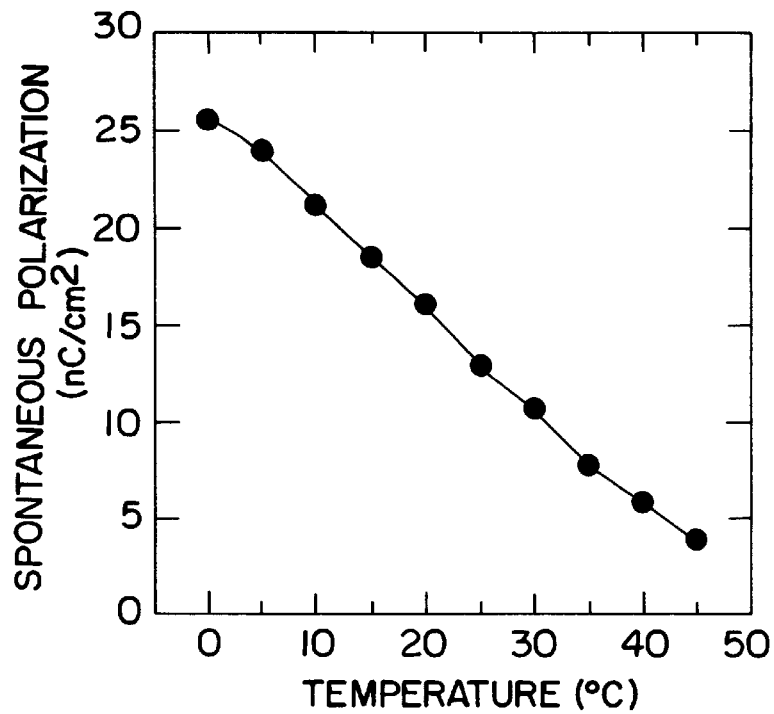
FIG. 9 is a drawing showing the dependency of spontaneous polarization Ps of ferroelectric liquid crystal composition (a) of the present invention on temperature.

Dependency of spontaneous polarization Ps of the composition (a) described above on temperature is shown in FIG. 9. As will be clear from FIG. 9, the spontaneous polarization Ps exhibited a large dependency on temperature.

Example 2

Ferroelectric liquid crystal composition (b) was prepared by mixing Compound (I-1) with Composition (K) in the following ratio:

| Compound (I-1) | 5% by weight |
| Composition (K) | 95% by weight |

This composition (b) had the following phase transition temperatures:

SC 73.6° C. SA 93.7° C. N 105.° C. I

Figure 10:
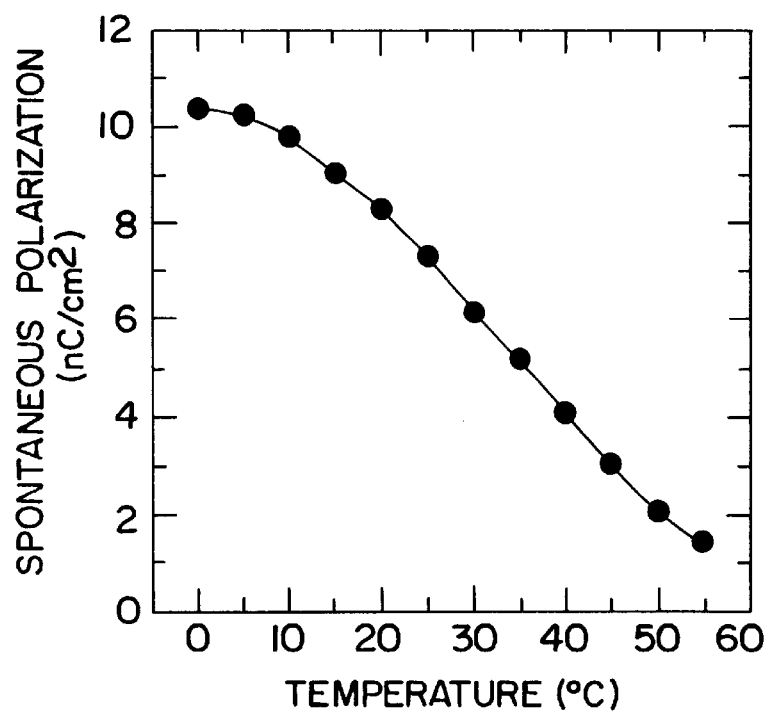
FIG. 10 is a drawing showing the dependency of spontaneous polarization Ps of ferroelectric liquid crystal composition (b) of the present invention on temperature.

Dependency of spontaneous polarization Ps of the composition (b) described above on temperature is shown in FIG. 10. As will be clear from FIG. 10, the spontaneous polarization Ps exhibited a large dependency on temperature.

Example 3

Ferroelectric liquid crystal composition (c) was prepared by mixing Compound (I-1) with Composition (L) in the following ratio:

| Compound (I-1) | 5% by weight |
| Composition (L) | 95% by weight |

This composition (c) had the following phase transition temperatures:

SC 79.2° C. SA 89.5° C. N 104.9° C. I

Figure 11:
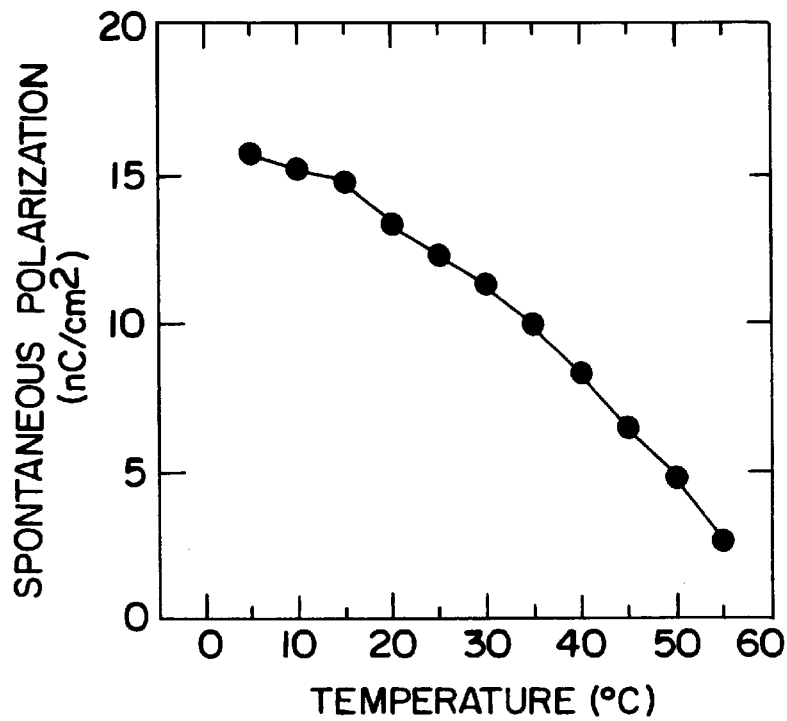
FIG. 11 is a drawing showing the dependency of spontaneous polarization Ps of ferroelectric liquid crystal composition (c) of the present invention on temperature.

Dependency of spontaneous polarization P, of the composition (c) described above on temperature is shown in FIG. 11. As will be clear from FIG. 11, the spontaneous polarization Ps exhibited a large dependency on temperature.

Example 4

Ferroelectric liquid crystal composition (d) was prepared by mixing Compound (I-1) with Composition (A) in the following ratio:

| Compound (I-1) | 4.5% by weight |
| Composition (A) | 95.5% by weight |

This composition (d) had the following phase transition temperatures:

SC 72.0° C. SA 86.0° C. N 96.4° C. I

Figure 12:
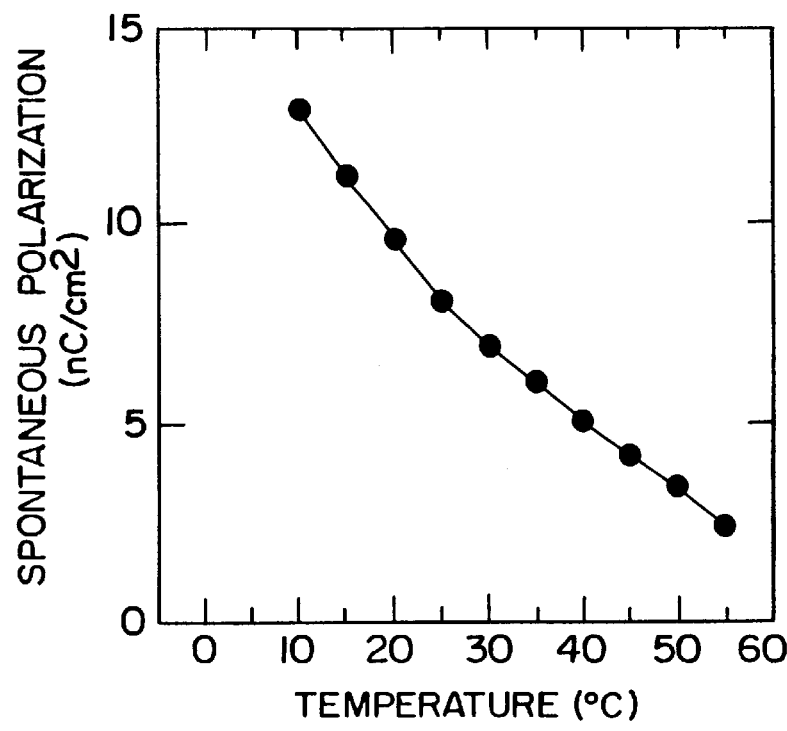
FIG. 12 is a drawing showing the dependency of spontaneous polarization Ps of ferroelectric liquid crystal composition (d) of the present invention on temperature.

Dependency of spontaneous polarization Ps of the composition (d) described above on temperature is shown in FIG. 12. As will be clear from FIG. 12, the spontaneous polarization Ps exhibited a large dependency on temperature.

Example 5

Ferroelectric liquid crystal composition (e) was prepared by mixing Compound (I-1) with Composition (F) in the following ratio:

| Compound (I-1) | 5% by weight |
| Composition (F) | 95% by weight |

This composition (e) had the following phase transition temperatures:

SC 73.5° C. SA 84.5° C. N 90.0° C. I

Dependency of spontaneous polarization Ps of the composition (e) described above on temperature is shown in FIG. 13. As will be clear from FIG. 13, the spontaneous polarization Ps exhibited a large dependency on temperature.

Figure 14:
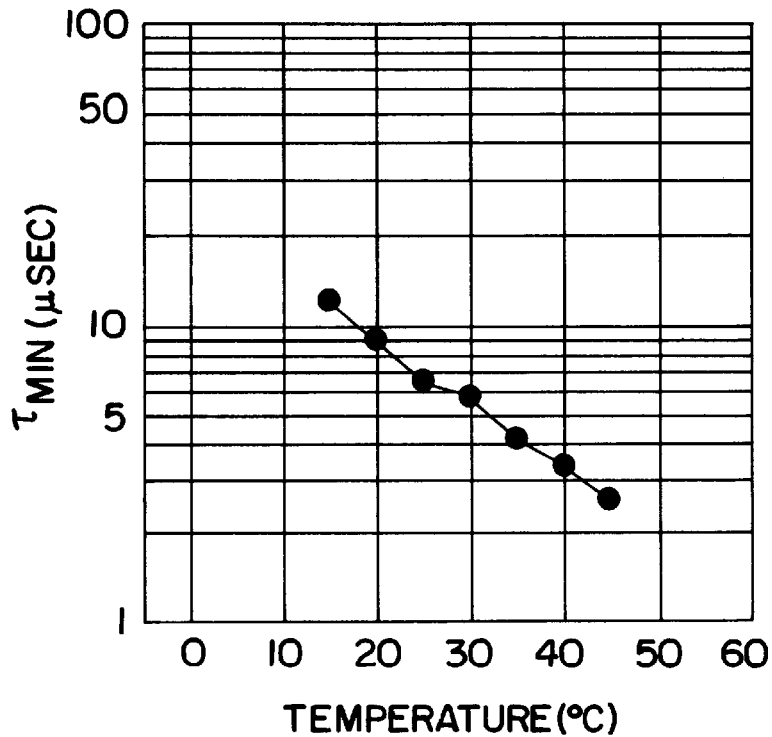
FIG. 14 is a drawing showing the dependency of $\tau_{min}$ of a ferroelectric liquid crystal display device fabricated by using ferroelectric liquid crystal composition (b) of the present invention on temperature.
Figure 18:
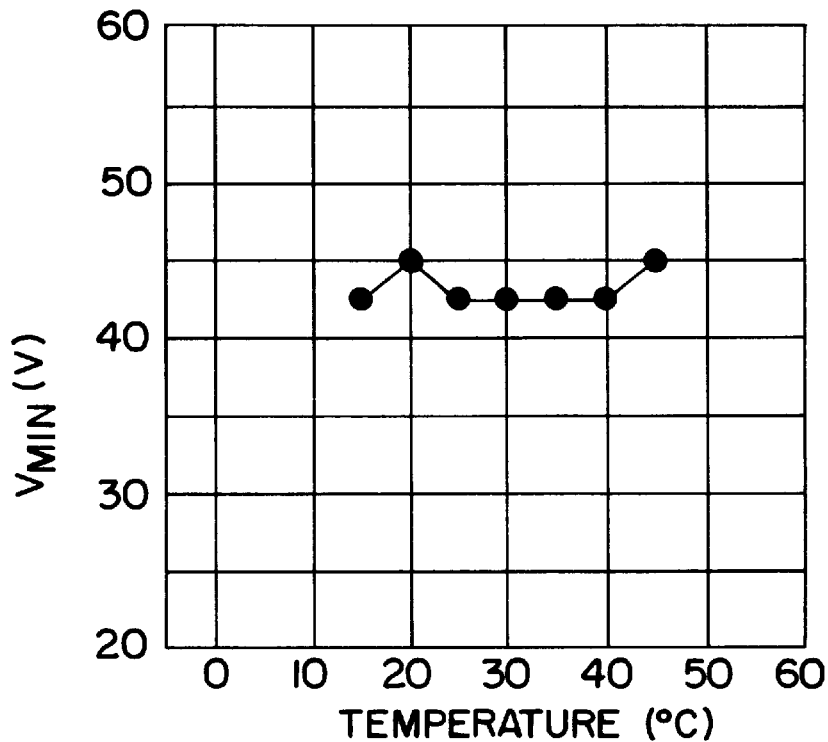
FIG. 18 is a drawing showing the dependency of $V_{min}$ of a ferroelectric liquid crystal display device fabricated by using ferroelectric liquid crystal composition (b) of the present invention on temperature.

Example 6

τ-V characteristic of a ferroelectric liquid crystal display device fabricated by using the liquid crystal composition (b) described in Example 2 was determined at different temperatures. Pulse width $\tau_{min}$ at a minimum value and the dependency of voltage $V_{min}$ on temperature at that time are shown in FIG. 14 and FIG. 18, respectively. From the Figs., it can be seen that the device exhibits a response at low voltages and at high speeds, and that their dependency on temperature is small.

Figure 15:
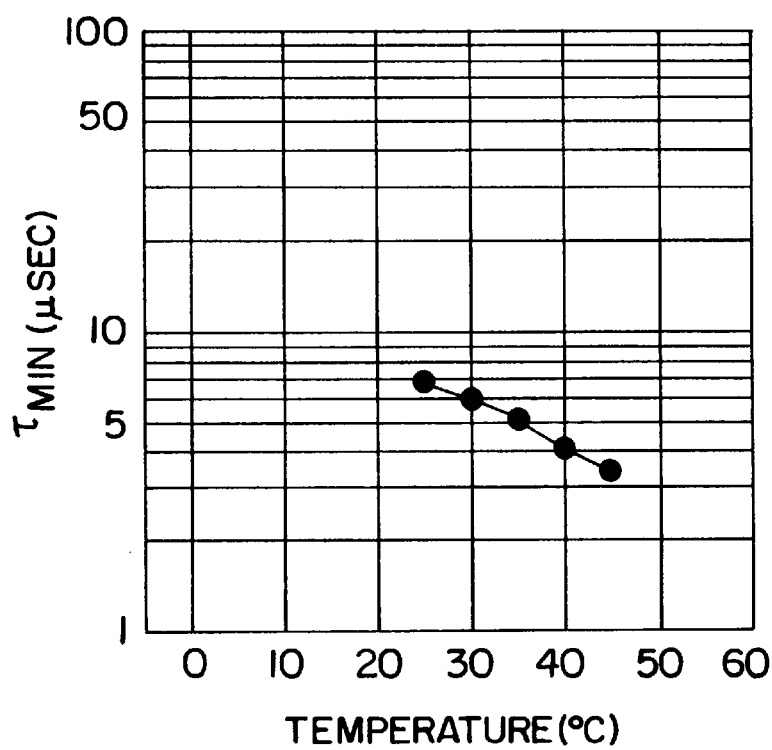
FIG. 15 is a drawing showing the dependency of $\tau_{min}$ of a ferroelectric liquid crystal display device fabricated by using ferroelectric liquid crystal composition (d) of the present invention on temperature.
Figure 19:
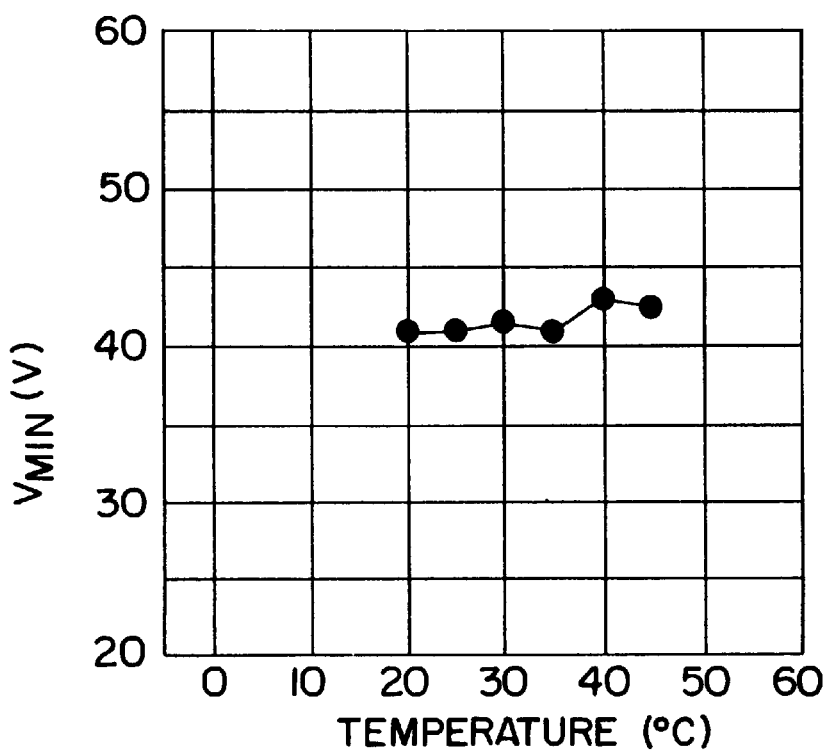
FIG. 19 is a drawing showing the dependency of $V_{min}$ of a ferroelectric liquid crystal display device fabricated by using ferroelectric liquid crystal composition (d) of the present invention on temperature.

Example 7

τ-V characteristic of a ferroelectric liquid crystal display device fabricated by using the liquid crystal composition (d) described in Example 4 was determined at different temperatures. Pulse width $\tau_{min}$ at a minimum value and the dependency of voltage $V_{min}$ on temperature at that time are shown in FIG. 15 and FIG. 19, respectively. From the Figs., it can be seen that the device exhibits a response at low voltages and at high speeds, and that their dependency on temperature is small.

Example 8

Ferroelectric liquid crystal composition (f) was prepared by mixing Compound (I-1) with Composition (E) in the following ratio:

| Compound (I-1) | 5% by weight |
| Composition (E) | 95% by weight |

Figure 16:
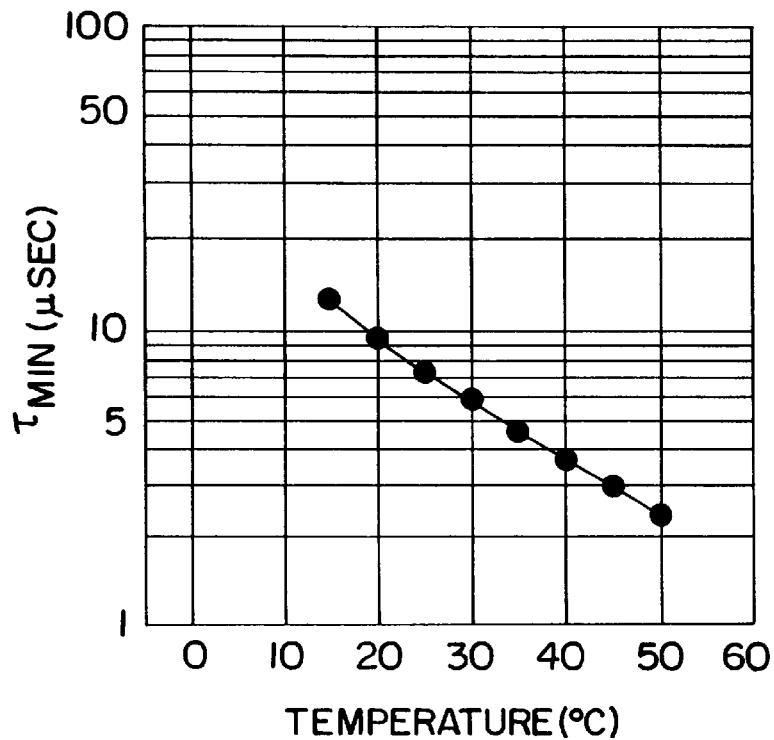
FIG. 16 is a drawing showing the dependency of $\tau_{min}$ of a ferroelectric liquid crystal display device fabricated by using ferroelectric liquid crystal composition (f) of the present invention on temperature.
Figure 20:
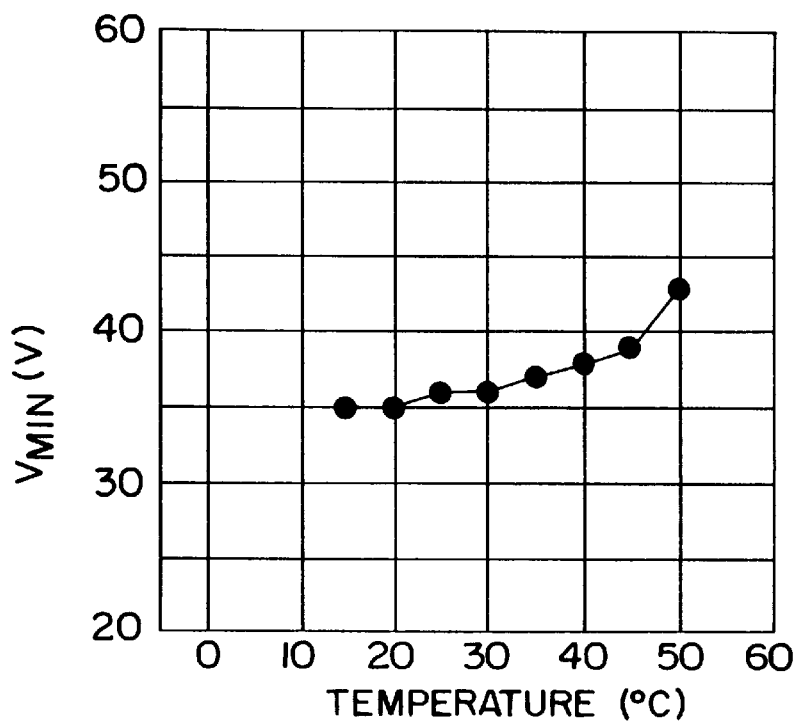
FIG. 20 is a drawing showing the dependency of $V_{min}$ of a ferroelectric liquid crystal display device fabricated by using ferroelectric liquid crystal composition (f) of the present invention on temperature.

This composition (f) had the following phase transition temperatures:

SC 79.0° C. SA 91.8° C. N 98.4° C. I

τ-V characteristic of a ferroelectric liquid crystal display device fabricated by using the liquid crystal composition (f) described above was determined at different temperatures. Pulse width $\tau_{min}$ at a minimum value and the dependency of voltage $V_{min}$ on temperature at that time are shown in FIG. 16 and FIG. 20, respectively. From the Figs., it can be seen that the device exhibits a response at low voltages and at high speeds, and that their dependency on temperature is small.

Figure 17:
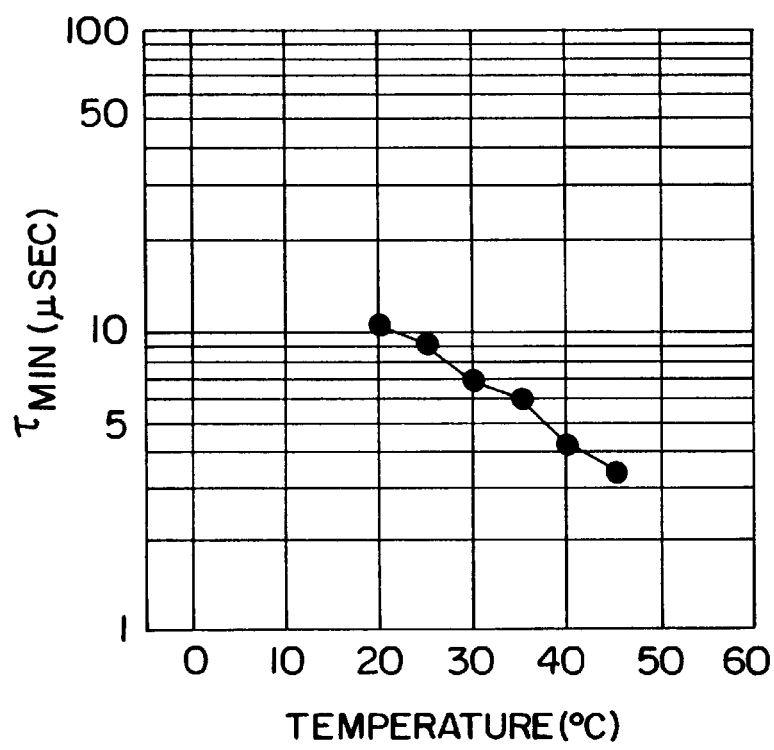
FIG. 17 is a drawing showing the dependency of $\tau_{min}$ of a ferroelectric liquid crystal display device fabricated by using ferroelectric liquid crystal composition (e) of the present invention on temperature.
Figure 21:
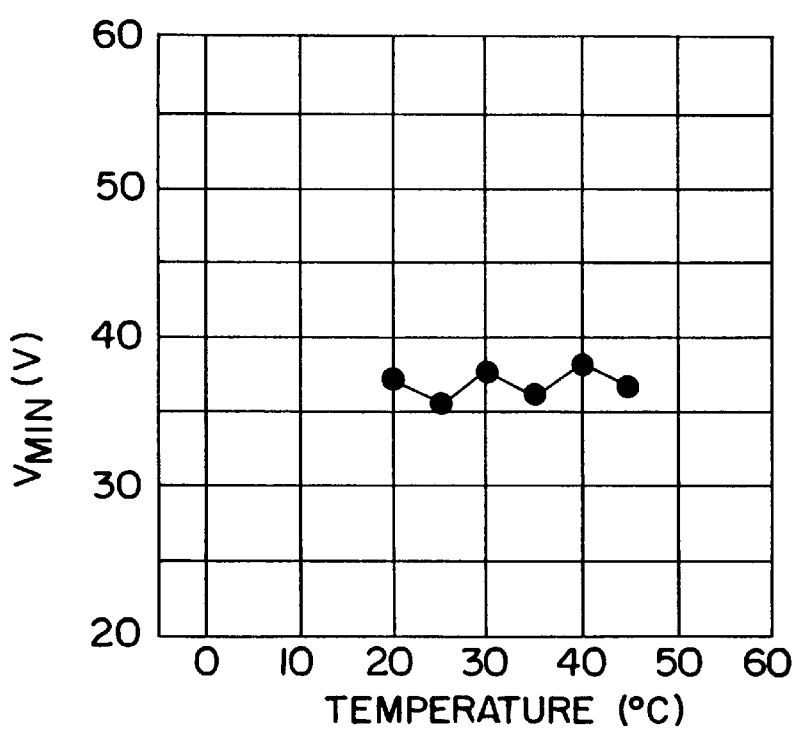
FIG. 21 is a drawing showing the dependency of $V_{min}$ of a ferroelectric liquid crystal display device fabricated by using ferroelectric liquid crystal composition (e) of the present invention on temperature.

Example 9

τ-V characteristic of a ferroelectric liquid crystal display device fabricated by using the liquid crystal composition (e)

described in Example 5 was determined at different temperatures. Pulse width $\tau_{min}$ at a minimum value and the dependency of voltage $V_{min}$ on temperature at that time are shown in FIG. 17 and FIG. 21, respectively. From the Figs., it can be seen that the device exhibits a response at low voltages and at high speeds, and that their dependency on temperature is small.

Example 10

Ferroelectric liquid crystal display device fabricated by using the composition (b) described in Example 2 was driven by using the driving waveform shown in FIG. 7. Driving conditions at this time and its results were as follows:

| Pulse width | Select voltage | Non-select voltage | Bias voltage |
|---|---|---|---|
| 3.0 µs | 37.5 V | 42.5 V | 5.0 V |

This time, it was possible to drive the device at low voltages and at high speeds, and the device exhibited an excellent contrast.

Example 11

Ferroelectric liquid crystal display device fabricated by using the composition (c) described in Example 3 was driven by using the driving waveform shown in FIG. 7. Driving conditions at this time and its results were as follows:

| Pulse width | Select voltage | Non-select voltage | Bias voltage |
|---|---|---|---|
| 3.6 µs | 32.5 V | 37.5 V | 5.0 V |

This time, it was possible to drive the device at low voltages and at high speeds, and the device Exhibited an excellent contrast.

Example 12

Ferroelectric liquid crystal composition (g) was prepared by mixing Compound (I-1) with Composition (M) in the following ratio:

| | |
|---|---|
| Compound (I-1) | 5% by weight |
| Composition (M) | 95% by weight |

This composition (g) had the following phase transition temperatures:

SC 79.0° C. SA 100.0° C. N 112.9° C. I

Ferroelectric liquid crystal display device fabricated by using the composition (g) described above was driven by using the driving waveform shown in FIG. 7. Driving conditions at this time and its results were as follows:

| Pulse width | Select voltage | Non-select voltage | Bias voltage |
|---|---|---|---|
| 3.8 µs | 30 V | 35 V | 5.0 V |

This time, it was possible to drive the device at low voltages and at high speeds, and the device exhibited an excellent contrast.

Example 13

Ferroelectric liquid crystal composition (h) was prepared by mixing Compound (I-1) with Composition (A) in the following ratio:

| | |
|---|---|
| Compound (I-1) | 5% by weight |
| Composition (A) | 95% by weight |

This composition (h) had the following phase transition temperatures:

SC 72.0° C. SA 85.7° C. N 95.9° C. I

Ferroelectric liquid crystal display device fabricated by using the composition (h) described above was driven by using the driving waveform shown in FIG. 7. Driving conditions at this time and its results were as follows:

| Pulse width | Select voltage | Non-select voltage | Bias voltage |
|---|---|---|---|
| 2.1 µs | 40 V | 45 V | 5.0 V |

This time, it was possible to drive the device at low voltages and at high speeds, and the device exhibited an excellent contrast.

Example 14

Ferroelectric liquid crystal display device fabricated by using the composition (d) described in Example 4 was driven by using the driving waveform shown in FIG. 7. Driving conditions at this time and its results were as follows:

| Pulse width | Select voltage | Non-select voltage | Bias voltage |
|---|---|---|---|
| 3.0 µs | 34.5 V | 39.5 V | 5.0 V |

This time, it was possible to drive the device at low voltages and at high speeds, and the device exhibited an excellent contrast.

Example 15

Ferroelectric liquid crystal display device fabricated by using the composition (f) described in Example 8 was driven by using the driving waveform shown in FIG. 7. Driving conditions at this time and its results were as follows:

| Pulse width | Select voltage | Non-select voltage | Bias voltage |
|---|---|---|---|
| 3.4 μs | 32.5 V | 37.5 V | 5.0 V |

This time, it was possible to drive the device at low voltages and at high speeds, and the device exhibited an excellent contrast.

Example 16

Ferroelectric liquid crystal composition (i) was prepared by mixing Compound (I-1) with Composition (N) in the following ratio:

| | |
|---|---|
| Compound (I-1) | 5% by weight |
| Composition (N) | 95% by weight |

This composition (i) had the following phase transition temperatures:

SC 75.1° C. SA 87.0° C. N 99.7° C. I

Ferroelectric liquid crystal display device fabricated by using the composition (i) described above was driven by using the driving waveform shown in FIG. 7. Driving conditions at this time and its results were as follows:

| Pulse width | Select voltage | Non-select voltage | Bias voltage |
|---|---|---|---|
| 2.2 μs | 40 V | 45 V | 5.0 V |

This time, it was possible to drive the device at low voltages and at high speeds, and the device exhibited an excellent contrast.

Example 17

Ferroelectric liquid crystal composition (j) was prepared by mixing Compound (I-1) with Composition (O) in the following ratio:

| | |
|---|---|
| Compound (I-1) | 5% by weight |
| Composition (O) | 95% by weight |

This composition (j) had the following phase transition temperatures:

SC 74.4° C. SA 91.5° C. N 103.6° C. I

Ferroelectric liquid crystal display device fabricated by using the composition (j) described above was driven by using the driving waveform shown in FIG. 7. Driving conditions at this time and its results were as follows:

| Pulse width | Select voltage | Non-select voltage | Bias voltage |
|---|---|---|---|
| 2.7 μs | 37.5 V | 42.5 V | 5.0 V |

This time, it was possible to drive the device at low voltages and at high speeds, and the device exhibited an excellent contrast.

Example 18

Ferroelectric liquid crystal composition (k) was prepared by mixing Compound (I-1) with Composition (D) in the following ratio:

| | |
|---|---|
| Compound (I-1) | 5% by weight |
| Composition (D) | 95% by weight |

This composition (k) had the following phase transition temperatures:

SC 79.6° C. SA 96.0° C. N 101.0° C. I

Ferroelectric liquid crystal display device fabricated by using the composition (k) described above was driven by using the driving waveform shown in FIG. 7. Driving conditions at this time and its results were as follows:

| Pulse width | Select voltage | Non-select voltage | Bias voltage |
|---|---|---|---|
| 4.6 μs | 34.5 V | 39.5 V | 5.0 V |

This time, it was possible to drive the device at low voltages and at high speeds, and the device exhibited an excellent contrast.

Example 19

Ferroelectric liquid crystal composition (Q) was prepared by mixing Compound (I-1) with Composition (P) in the following ratio:

| | |
|---|---|
| Compound (I-1) | 5% by weight |
| Composition (P) | 95% by weight |

This composition (Q) had the following phase transition temperatures:

SC 77.0° C. SA 86.7° C. N 93.3° C. I

Ferroelectric liquid crystal display device fabricated by using the composition (Q) described above was driven by using the driving waveform shown in FIG. 7. Driving conditions at this time and its results were as follows:

| Pulse width | Select voltage | Non-select voltage | Bias voltage |
|---|---|---|---|
| 3.7 μs | 30.0 V | 35.0 V | 5.0 V |

This time, it was possible to drive the device at low voltages and at high speeds, and the device exhibited an excellent contrast.

Example 20

Ferroelectric liquid crystal composition (m) was prepared by mixing Compound (I-1) with Composition (G) in the following ratio:

| Compound (I-1) | 5% by weight |
| --- | --- |
| Composition (G) | 95% by weight |

This composition (m) had the following phase transition temperatures:

SC 71° C. SA 82° C. N 87° C. I

Ferroelectric liquid crystal display device fabricated by using the composition (m) described above was driven by using the driving waveform shown in FIG. 7. Driving conditions at this time and its results were as follows:

| Pulse width | Select voltage | Non-select voltage | Bias voltage |
| --- | --- | --- | --- |
| 3.6 μs | 31.0 V | 36.0 V | 5.0 V |

This time, it was possible to drive the device at low voltages and at high speeds, and the device exhibited an excellent contrast.

Example 21

Ferroelectric liquid crystal composition (n) was prepared by mixing Compound (I-1) with Composition (I) in the following ratio:

| Compound (I-1) | 5% by weight |
| --- | --- |
| Composition (I) | 95% by weight |

This composition (n) had the following phase transition temperatures:

SC 77° C. SA 89° C. N 96° C. I

Ferroelectric liquid crystal display device fabricated by using the composition (n) described above was driven by using the driving waveform shown in FIG. 7. Driving conditions at this time and its results were as follows:

| Pulse width | Select voltage | Non-select voltage | Bias voltage |
| --- | --- | --- | --- |
| 5.4 μs | 28.0 V | 33.0 V | 5.0 V |

This time, it was possible to drive the device at low voltages and at high speeds, and the device exhibited an excellent contrast.

Example 22

Ferroelectric liquid crystal composition (o) was prepared by mixing Compound (I-4) with Composition (J) in the following ratio:

| Compound (I-4) | 4.5% by weight |
| --- | --- |
| Composition (J) | 95.5% by weight |

This composition (o) had the following phase transition temperatures:

SC 73.4° C. SA 86.9° C. N 93.1° C. I

Ferroelectric liquid crystal display device fabricated by using the composition (o) described above was driven by using the driving waveform shown in FIG. 7. Driving conditions at this time and its results were as follows:

| Pulse width | Select voltage | Non-select voltage | Bias voltage |
| --- | --- | --- | --- |
| 3.6 μs | 32.0 V | 37.0 V | 5.0 V |

This time, it was possible to drive the device at low voltages and at high speeds, and the device exhibited an excellent contrast.

Example 23

Ferroelectric liquid crystal composition (p) was prepared by mixing Compound (I-3) with Composition (Q) in the following ratio:

| Compound (I-3) | 4% by weight |
| --- | --- |
| Composition (Q) | 96% by weight |

This composition (p) had the following phase transition temperatures:

SC 78° C. SA 93° C. N 100° C. I

Ferroelectric liquid crystal display device fabricated by using the composition (p) described above was driven by using the driving waveform shown in FIG. 5. Driving conditions at this time and its results were as follows:

| Pulse width | Select voltage | Non-select voltage | Bias voltage |
| --- | --- | --- | --- |
| 7.7 μs | 40.0 V | 45.0 V | 5.0 V |

This time, it was possible to drive the device at low voltages and at high speeds, and the device exhibited an excellent contrast.

Example 24

Ferroelectric liquid crystal composition (q) was prepared by mixing Compound (I-3) with Composition (H) in the following ratio:

| Compound (I-3) | 4% by weight |
| --- | --- |
| Composition (H) | 96% by weight |

This composition (q) had the following phase transition temperatures:

SC 75° C. SA 88° C. N 95° C. I

Ferroelectric liquid crystal display devices fabricated by using the composition (q) described above was driven by using the driving waveform shown in FIG. 7. Driving conditions at this time and its results were as follows:

| Pulse width | Select voltage | Non-select voltage | Bias voltage |
|---|---|---|---|
| 5.3 μs | 45.0 V | 50.0 V | 5.0 V |

This time, it was possible to drive the device at low voltages and at high speeds, and the device exhibited an excellent contrast.

Comparative Example 1

Ferroelectric liquid crystal composition (Compar.-a) was prepared by mixing optically active compound (C-1)

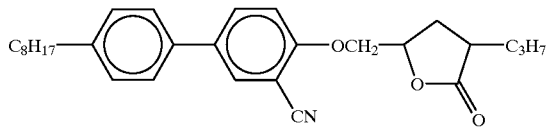

with the composition (K) described above in the following ratio:

| Compound (C-1) | 2.5% by weight |
|---|---|
| Composition (K) | 97.5% by weight |

This composition (Compar.-a) had the following phase transition temperatures:

SC 66° C. SA 92° C. N 104° C. I

Figure 22:
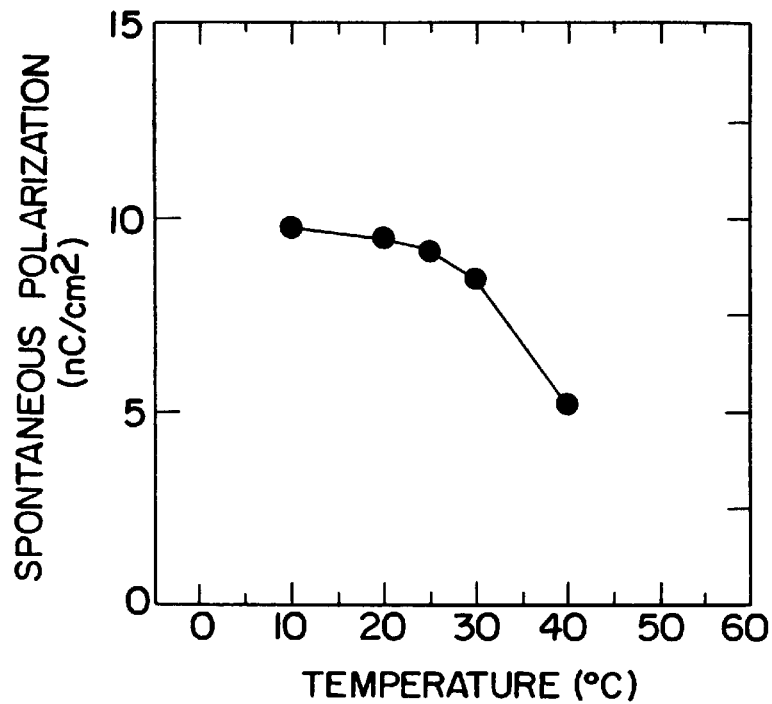
FIG. 22 is a drawing showing the dependency of spontaneous polarization Ps of ferroelectric liquid crystal composition (Compar.-a) used in a Comparative Example on temperature.

Dependency of spontaneous polarization Ps of the composition (Compar.-a) described above on temperature is shown in FIG. 22. From FIG. 22, it can be seen that the value of the dependency of spontaneous polarization Ps on temperature is saturated and small particularly at low temperature side.

Comparative Example 2

Figure 23:
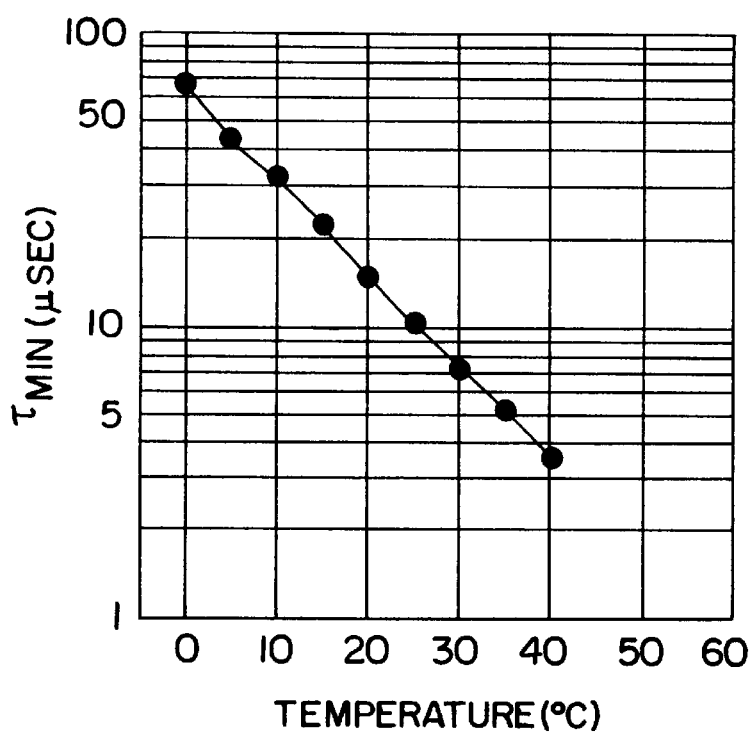
FIG. 23 is a drawing showing the dependency of $\tau_{min}$ of a ferroelectric liquid crystal display device fabricated by using a ferroelectric liquid crystal composition (Compar.-a) used in a Comparative Example on temperature.
Figure 24:
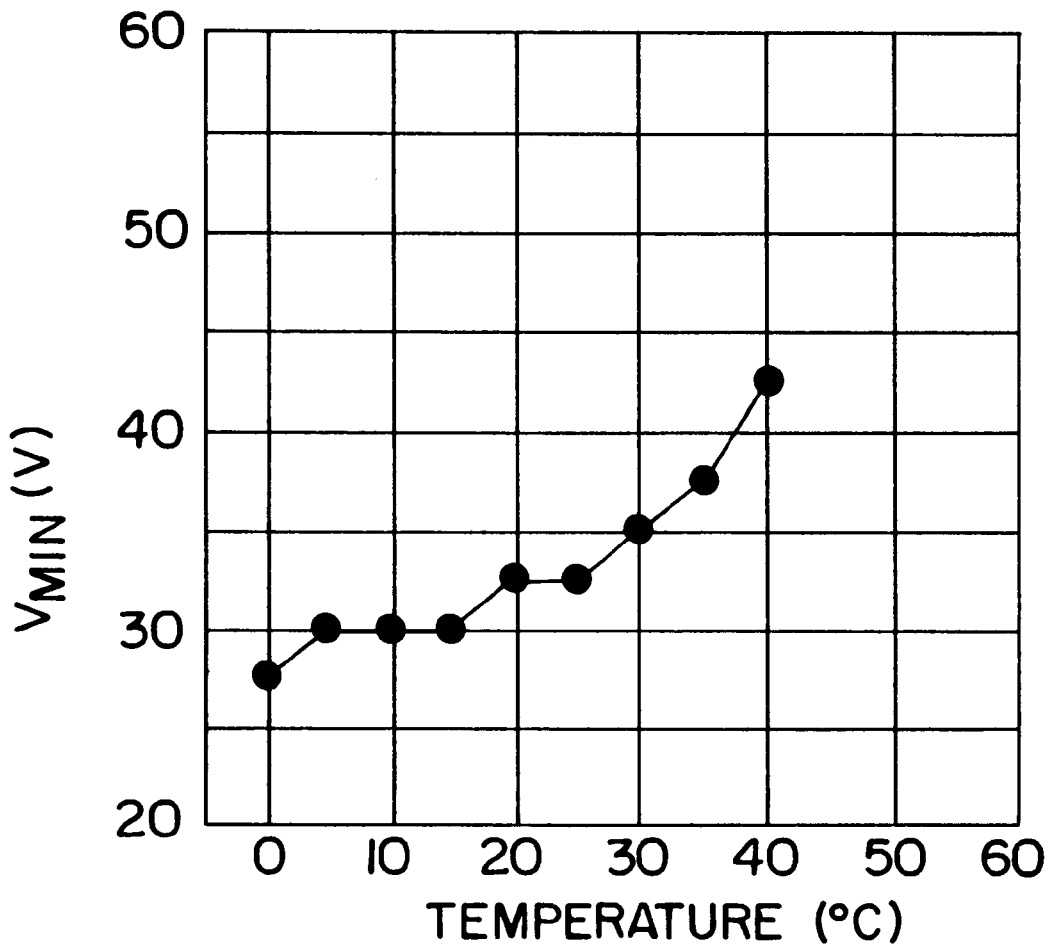
FIG. 24 is a drawing showing the dependency of $V_{min}$ of a ferroelectric liquid crystal display device fabricated by using a ferroelectric liquid crystal composition (Compar.-a) used in a Comparative Example on temperature.

Liquid crystal display device was fabricated by using the liquid crystal composition (Compar.-a) of Comparative Example 1, and its τ-V characteristic was determined at different temperatures. Pulse width τmin at a minimum value and the dependency of voltage $V_{min}$ on temperature at that time are shown in FIG. 23 and FIG. 24, respectively. As will be clear from the Figs., dependency of both $\tau_{min}$ and $V_{min}$ on temperature was large.

As demonstrated in Examples and Comparative Examples, ferroelectric liquid crystal display devices having a large dependency of spontaneous polarization Ps on temperature and a small dependency of response speed on temperature can be obtained according to the present invention. Ferroelectric liquid crystal compositions provided by the present invention exhibit large dependency of their spontaneous polarization Ps on temperature. Liquid crystal display devices using this composition as their part exhibit a small dependency of response speed on temperature and thus can obtain a wide temperature margin when actually used.

What is claimed is:

1. A ferroelectric liquid crystal composition comprising 4 to 10% by weight of at least one compound expressed by the following general formula

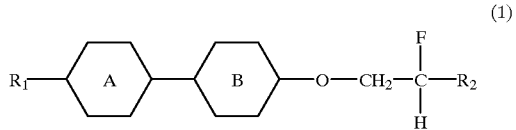

wherein $R_1$ represents an alkyl group or alkoxy group having 4 to 16 carbon atoms, $R_2$ represents an alkyl group having 2 to 12 carbon atoms, and ring A-B represents 5-substituted, 2-(4-substituted phenyl) pyridine or 1-, 4-(5-substituted pyridinyl-2) benzene, 47.5 to 80.64% by weight of at least one compound expressed by the following general formula (2)

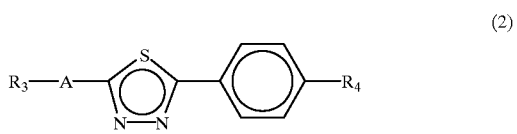

wherein $R_3$ and $R_4$ independently represent an alkyl group or alkoxy group having 1 to 15 carbon atoms, and A represents 1,4-phenylene, 1,4-cyclohexylene, or single bond, and 15.36 to 47.75% by weight of at least one compound expressed by the following formula (3)

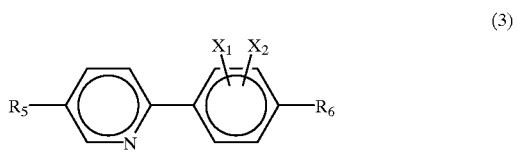

wherein $R_5$ and $R_6$ independently represent an alkyl group or alkoxy group having 1 to 18 carbon atoms, and $X_1$ and $X_2$ independently represent H or F.

2. The ferroelectric liquid crystal composition according to claim 1 wherein the composition further comprises, as a component other than the compounds expressed by one of the general formulas (1), (2), and (3), at least one optically active compound having a helical direction which is opposite to the helical direction of a compound expressed by the general formula (1) each induced in cholesteric phase.

3. The ferroelectric liquid crystal composition according to claim 1 wherein phase transition series of the composition includes isotropic liquid phase, cholesteric phase, smectic A phase, and chiral smectic C phase in order from high temperature side.

4. The ferroelectric liquid crystal composition according to claim 1 wherein the composition has a negative dielectric anisotropy (Δε) absolute value of 2 or more.

5. A ferroelectric liquid crystal display device comprising a ferroelectric liquid crystal composition defined in claim 1.

6. The ferroelectric liquid crystal display device according to claim 5 wherein the bending direction of a smectic layer structure of the ferroelectric liquid crystal composition is the same as the pretilt direction of liquid crystal molecules at the interface of the liquid crystal with an alignment film.

7. The ferroelectric liquid crystal display device according to claim 5, wherein the pretilt angle of liquid crystal molecules at the interface of the liquid crystal with an alignment film is 10° or less.

8. The ferroelectric liquid crystal display device according to claim 6 wherein the pretilt angle of liquid crystal molecules at the interface of the liquid crystal with mn alignment film is 10° or less.

9. The ferroelectric liquid crystal display device according to claim 5, wherein the device comprises a pair of insulating substrates each having an electrode and a layer of ferroelectric liquid crystal composition intervened between the substrates, the ferroelectric liquid crystal composition having cholesteric phase and chiral smectic C phase, cholesteric pitch in the cholesteric phase being 0.5 time as long as the thickness of the layer of liquid crystal composition or longer, and chiral smectic C pitch in the chiral smectic C phase being as long as the thickness of the layer of liquid crystal composition or longer.

10. The ferroelectric liquid crystal display device according to claim 6 wherein the device comprises a pair of insulating substrates each having an electrode and a layer of ferroelectric liquid crystal composition intervened between the substrates, the ferroelectric liquid crystal composition saving cholesteric phase and chiral smectic C phase, cholesteric pitch in the cholesteric phase being 0.5 time as long as the thickness of the layer of liquid crystal composition or longer, and cholesteric C pitch in the chiral smectic C phase being as long as the thickness of the layer of liquid crystal composition or longer.

11. In a method for driving a ferroelectric liquid crystal display device comprising a pair of insulating substrates each having an electrode, a ferroelectric liquid crystal composition intervened between the substrates, a driving means for switching the optical axis of liquid crystals by selectively applying a voltage on the electrodes, and a means for optically identifying the switching of the optical axis, by using voltages V1, V2, V3, and V4 having the following relation:

$$0 < V2 < V4 \text{ and}$$

$$V2-V1 < V4-V3,$$

the ferroelectric liquid crystal composition being defined in claim 1 and having at least two stable states, a plural number of scanning electrodes and plural number of signal electrodes as electrode being arranged in mutually crossing direction, the domains defined by the crossing scanning electrodes and signal electrodes being regarded as pixel, the improvement wherein pixels are driven in a method in which, when a pixel is selected, a first pulse voltage (V1) and then a second pulse voltage (V2), or a first pulse voltage (−V1) and then a second pulse voltage (−V2) are applied for the first time onto the pixel in the course of rewriting to bring the ferroelectric liquid crystal molecules which constitute a certain area in the pixel into one stable state or another stable state, and subsequently, a first pulse voltage (V3) and then a second pulse voltage (V4), or a first pulse voltage (−V3) and then a second pulse voltage (−V4) are applied onto the same pixel in the hold time to hold a stable state of ferroelectric liquid crystal molecules which constitute the same area in the pixel.

12. The method for driving a ferroelectric liquid crystal display device according to claim 11 wherein the ferroelectric liquid crystal has two stable states, has a pulse voltage which provides a minimum pulse width in the pulse width-pulse voltage characteristic of a unipolar pulse necessary for rewriting one stable state to another stable state, and has a pulse voltage of lower than 60 V.

13. The method for driving a ferroelectric liquid crystal display device according to claim 11 wherein the ferroelectric liquid crystal has two stable states, has a pulse voltage which provides a minimum pulse width in the pulse width-pulse voltage characteristic of a unipolar pulse necessary for rewriting one stable state to another stable state, and has a pulse voltage of lower than 35 V.

* * * * *